(12) United States Patent
Rittenhouse

(10) Patent No.: US 8,253,299 B1
(45) Date of Patent: *Aug. 28, 2012

(54) WOUND MAGNETIC FLUX CHANNEL TRANSVERSE WOUND STATOR PERMANENT MAGNET MOTOR

(76) Inventor: Norman P. Rittenhouse, Fairbury, IL (US)

(*) Notice: Subject to any disclaimer, the term of this patent is extended or adjusted under 35 U.S.C. 154(b) by 181 days.

This patent is subject to a terminal disclaimer.

(21) Appl. No.: 12/784,690

(22) Filed: May 21, 2010

Related U.S. Application Data

(60) Continuation-in-part of application No. 12/486,957, filed on Jun. 18, 2009, now Pat. No. 7,868,510, which is a continuation-in-part of application No. 12/371,823, filed on Feb. 16, 2009, now Pat. No. 7,723,891, which is a division of application No. 11/731,427, filed on Mar. 30, 2007, now Pat. No. 7,492,074.

(51) Int. Cl.
*H02K 1/12* (2006.01)
*H02K 21/12* (2006.01)

(52) U.S. Cl. ....................... 310/257; 310/267

(58) Field of Classification Search ............ 310/43, 310/156.53, 156.56, 216.003, 216.023–216.025, 310/216.027, 216.033–216.035, 216.066–216.067, 310/216.069–216.074, 254, 267, 268
See application file for complete search history.

(56) References Cited

U.S. PATENT DOCUMENTS

| 7,492,074 | B1* | 2/2009 | Rittenhouse | 310/265 |
| 7,579,742 | B1* | 8/2009 | Rittenhouse | 310/257 |
| 7,723,891 | B2* | 5/2010 | Rittenhouse | 310/216.023 |
| 7,868,510 | B2* | 1/2011 | Rittenhouse | 310/216.069 |

* cited by examiner

*Primary Examiner* — Tran Nguyen
(74) *Attorney, Agent, or Firm* — Brian S. Steinberger; Phyllis K. Wood; Law Offices of Brian S. Steinberger, P.A.

(57) ABSTRACT

A motor including an outside rotor having a rotor disc with plural magnets alternating polarities flush mounted in the disc, an inside stator assembly with a transversely wound stator windings encased by a ring of wound magnetic flux channel pole pieces to assemble within a hub of a motor, and a controller coupled with feedback electronics for monitoring a timing, speed and direction and coupling a signal to a processing unit for adjusting the drive electronics driving the phase windings. A u-shaped channel above the bobbin filed transverse winding coil to receive the rotor disc and focus the captured magnetic flux in the pole pieces toward the magnets. In an embodiment the wound magnetic flux channel pole pieces and encased transverse coil winding of the inside stator correspond to one phase of the motor; and a section of each one of the transverse windings passing through one channel, the remaining section folding back outside in close proximity to the outer base of the set of wound magnetic flux channel pole pieces.

36 Claims, 19 Drawing Sheets

WOUND MAGNETIC FLUX CHANNEL TRANSVERSE WOUND STATOR PERMANENT MAGNET MOTOR

This application is a continuation-in-part of U.S. application Ser. No. 12/486,957 filed on Jun. 18, 2009 which is a continuation-in-part of U.S. application Ser. No. 12/371,823 filed on Feb. 16, 2009, which is a divisional application of U.S. application Ser. No. 11/731,427 filed on Mar. 30, 2007, now U.S. Pat. No. 7,492,074.

FIELD OF THE INVENTION

This invention relates to motors and, in particular, to methods, systems and apparatus for a high efficiency direct drive high torque parallel pole motor utilizing wound magnetic flux channel parallel pole pieces with transverse flux stator windings.

BACKGROUND AND PRIOR ART

Approximately 93% of motors constructed use iron cores, or variations thereof, to concentrate magnetic flux and boost torque. "Coreless" motors are suited for very high RPM's with lOW torque and iron core motors usually utilize insulated steel laminations in their stators which reduce heat losses from eddy currents. However, even with thinner laminations, the eddy currents are only blocked in one plane. So to further reduce eddy current losses, silicon is typically added to the steel to reduce its electrical conductivity. Although the silicon reduces some remaining eddy current losses (by reducing the current conductivity), the addition of silicon actually worsens the magnetic conductivity. This reduction of magnetic strength reduces the maximum amount of torque produced, and also reduces electrical efficiency.

Most prior art multi-phase motors use phase windings radially sequenced around the plane of rotation. The close coupled proximity results in "Armature Effect" which reduces efficiency at higher speeds. The usual multi-phase high speed motors also require a gearbox or other loss prone speed reducing device in order to boost torque. Additionally, conventional motors use some variation of axial or radial flux, with multiple salient windings wound around iron type cores. Although this boosts magnetic flux, it also increases inductance and electrical resistance, and reactance. At higher speeds, the inductive and reactive losses limit top speed and efficiency at high speed.

Known prior art direct drive motors include U.S. Pat. No. 4,625,392 issued to Stokes on Dec. 2, 1986 titled Method of manufacturing a molded rotatable assembly for dynamoelectric machines describes molding a rotor of a motor from magnetic material. However, it does not involve Transverse Flux and does not use molded material for the stator.

U.S. Pat. No. 4,853,567 titled Direct Drive Motor issued on Aug. 1, 1989, which describes a three phase outer rotor motor. However, it uses conventional configuration with the three phase windings sequentially located within the same axis, and does not use Transverse Flux.

U.S. Pat. No. 5,777,413 issued to Lange et al. on Jul. 7, 1999 titled Transverse flux motor with magnetic floor gap describes a locomotive motor with Transverse Flux. However, it uses conventional iron laminations as its flux path, and is mainly concerned with physically flattening the motor to allow it to fit into the space between the floor of the locomotive and the train axle.

Prior art transverse Flux motors have historically been too costly to construct, and have rarely been used. This invention simplifies construction and lowers costs of Transverse Flux motors, and at the same time increases electrical efficiency to a higher level than before.

U.S. Patent Application No. 2006/0208602 filed on Mar. 16, 2006 to Enomoto teaches a multiple phase claw pole type motor which includes a plurality of claw poles facing a rotor in a state of being separated from the rotor by a small gap, a radial yoke extending radially outwardly from this claw, and an outer peripheral yoke extending from this radial yoke portion in the same direction as the direction of extension of the claw portion, a stator core formed by alternately placing the claw poles in a circumferential direction so that a distal end of each claw portion faces the outer peripheral yoke of an adjacent one of the claw poles, and a stator constructed by sandwiching an annular coil with the adjacent claw poles of this stator core, a multiple phase claw pole type motor characterized in that the claw poles are formed by compacting a magnetic powder and are formed of a magnetic compact having a DC magnetizing property.

The differences between the "claw pole" and the parallel pole motor is that claw pole motors have been around since the 1930's and have fatal disadvantages including that they are extremely inefficient—typical values of efficiency ate 45-65%; they are limited in torque; eddy currents are very high and fringing losses are very high. Most applications use "claw" shaped poles in an attempt to minimize this loss. That trapazoidal shape of poles however, further limits torque.

Unlike Enomoto, U.S. patent application Ser. No. 11/731, 427 filed on Mar. 30, 2007, now U.S. Pat. No. 7,492,074 issued on Feb. 17, 2009 to Rittenhouse, describes a direct drive motor, not a claw pole motor. The Rittenhouse '074 direct drive motor overcame a problem with prior art motors by using separate, independent, uncoupled planes for each phase, and phase and pulse timing to eliminate the "Armature Effect" which results is much higher efficiency at higher speed. The motor also has very high torque and can drive directly most loads without requiring clutches, gearboxes, or other speed reducing devices. The result is greater efficiency, lower costs, and fewer moving parts.

The Rittenhouse '074 patent also overcomes prior problems associated with boosting magnetic flux, which increases inductance and resistance and at higher speeds, the inductive losses limit top speed and efficiency at high speed. The direct drive motor of the present invention can use radial flux construction, but the preferred embodiment is Transverse Flux construction. In Transverse Flux construction, one large single winding powers each phase. Because magnetic flux is directly proportional to Ampere-Turns, the same magnetic flux can be achieved with more turns with less amperage, or higher amperage and fewer turns. In the preferred embodiment, this novel motor has fewer turns, and higher amperages. With fewer turns, the inductance is less, and with larger copper conductors the electrical resistance is also less. Since the inductance and resistance are reduced, both the inductive losses and the resistive losses are greatly reduced which results in higher efficiency and a much higher usable speed range. However, performance and cost of Neodymium-iron-boron permanent magnets have increased since the development and filing of the Rittenhouse '074 patent.

Co-pending U.S. patent application Ser. No. 12/486,957 filed on Jun. 18, 2009 by the same inventor as this application, which is incorporated herein by reference, teaches a motor including an outside rotor having a rotor disc with plural magnets alternating polarities flush mounted in the disc, an inside stator assembly with a ring of pole pieces forming a channel to house a transversely wound stator windings, and a controller coupled with feedback electronics for monitoring a timing, speed and direction and coupling a signal to a processing unit for adjusting the drive electronics driving the phase windings. A u-shaped gap above the channel to receive the rotor disc and focus the captured magnetic flux in the pole pieces toward the magnets. In an embodiment the molded magnetic flux channel pole pieces of the inside stator are sets of molded magnetic flux channel pole pieces, each set forming a channel and corresponding to one phase of the motor; and a section of each one of the transverse windings passing through one channel, the remaining section folding back outside the set in close proximity to the outer base of the set of molded magnetic flux channel pole pieces.

What is needed is a direct drive motor that uses less magnetic weight and still has the same performance that can be three stator or one single stator that is fabricated using lower costs materials and allows robotic fabrication. The stator's magnetic flux path is nearly the same as the '957 application stators, and the performance of the completed motor or generator is nearly identical, but with reduced costs of materials and assembly. Also needed is a direct drive motor built with four main parts—the inert stator form, the coil bobbin, the transverse coil winding, and the wound magnetic flux channel composed of layered strands of insulated iron or other similar wire, or amorphous tape.

SUMMARY OF THE INVENTION

A primary objective of the invention is to provide methods, systems and devices for a very high efficiency direct drive high torque motor built of four main parts—the inert stator form, the coil bobbin, the transverse coil winding, and the wound magnetic flux channel composed of layered strands of insulated iron or other similar wire, or amorphous tape.

A secondary objective of the invention is to provide methods, systems and devices for a high efficiency direct drive high torque motor constructed to lower costs of materials and to allow robotic fabrication.

A third objective of the invention is to provide methods, systems and devices for a high efficiency direct drive high torque motor for use as a wheel motor. A tubeless tire can be mounted on the rotor drum and the tubeless tire can be partially filled with a liquid coolant which then cools to rotor drum and attached permanent magnets.

A first preferred embodiment of the invention is a parallel pole direct drive motor that includes an outside rotor having a rotor disc having plural holes around a circumference of the rotor disc a distance from the outer edge with plural magnets having alternating polarities flush mounted into the plural holes, an inside stator assembly having a ring of wound magnetic flux channel pole pieces corresponding to a phase of the motor attached with a bobbin housing a transversely wound stator windings to capture and focus the magnetic flux emanating from the transverse winding and channel to the plural pole pieces, each pole piece body having a u-shaped gap above the bobbin to receive the rotor disc and inserted magnets with a gap therebetween and cut to form the u-shaped gap to direct and focus the captured magnetic flux toward and delivering the captured magnetic flux to the flat, axial magnetic pole surfaces with parallel sides of the u-shaped gap, perpendicular magnetic lines of force emanating at the pole piece surfaces, and a controller coupled with a feedback electronics for monitoring a timing, speed and direction and coupling the feedback signal to a processing unit for determining and adjusting and drive electronics to driving the phase windings. The rotor disc containing the plural magnets can be plastic or other inert material and having plural alignment and mounting holes for connection of the torque produced by said interaction to the rotor of the motor/generator.

The wound magnetic flux channel pole pieces includes a ring shaped inert stator form having plural spaced apart spacer protrusions around the outer perimeter of the ring shaped inert stator form and an interior rim corresponding to the bobbin, the wound magnetic flux channel wound around the ring shaped inert stator form and attached bobbin housing the transverse coil winding, a portion of the spacer and wound magnetic flux channel removed to form a u-shaped isolation gap ring above the bobbin.

The wound magnetic flux channel pole pieces includes plural layered strands of insulated wire or amorphous tape to carry flux away from the wound pole pieces and the plural spaced apart spacers deflect the magnetic flux carrying wire or tape away from the adjacent wound magnetic flux channel pole pieces while the wire or tape is being wound around the inert stator form and attached bobbin. The u-shaped isolation gap includes plural alternating u-shaped wound magnetic pole pieces and u-shaped spacers, each u-shaped magnetic pole piece forming a first parallel pole piece and a second parallel pole piece each having a different polarity, the plural magnets passing between the parallel first and second pole piece surfaces during operation with a gap between each parallel pole pieces and each pole of the plural magnets. The plural wound magnetic flux channel pole pieces of the inside stator includes at least two sets of wound magnetic flux channel pole pieces and attached bobbin, each set separated by a distance and corresponding to one phase of the motor, and at least two transverse windings, a section of each one of the transverse windings passing through one of the bobbin, the remaining section of each transverse winding folding back outside the set of wound magnetic flux channel pole pieces in close proximity to the outer base of the set of corresponding wound magnetic flux channel pole pieces, each set of wound magnetic flux channel pole pieces and corresponding transverse winding forming a partial stator.

Further objects and advantages of this invention will be apparent from the following detailed description of preferred embodiments which are illustrated schematically in the accompanying drawings.

DESCRIPTION OF THE PREFERRED EMBODIMENTS

Figure 1:
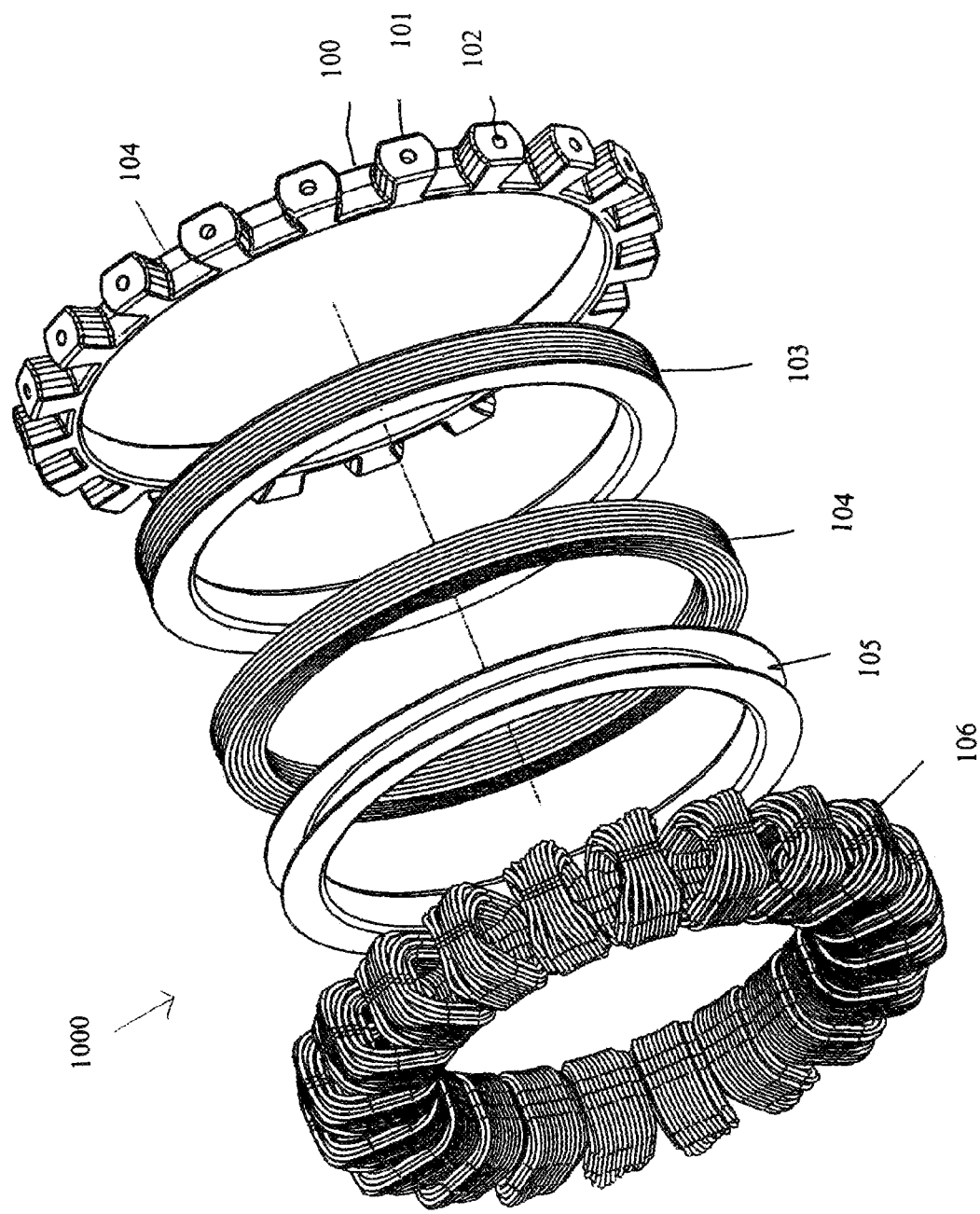
FIG. 1 is an exploded view of the four main components of the wound magnetic flux channel stator according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 1000 | direct drive motor |
| 100 | inert stator form |
| 101 | tooth/teeth |
| 102 | alignment hole |
| 103 | assembled winding bobbin |
| 104 | transverse winding |
| 105 | winding bobbin |
| 106 | wound magnetic flux channels |
| 107 | stepper motor |
| 108 | Toroid winder |
| 109 | male keyed feed wheel |

| | |
|---|---|
| 110 | clearance spacing |
| 111 | male alignment keying pin |
| 114 | magnet ring |
| 118 | marine propeller blase |
| 200 | winding machine |
| 300 | wound stator assembly |
| 1130 | permanent magnets |
| 1160 | rotating disc |
| 1160a | rotating disc, phase A |
| 1160b | rotating disc, phase B |
| 1160c | rotating disc, phase C |
| 1164 | spacer |
| 1170 | alignment |
| 1810 | detector module |
| 1820 | controller |
| 1822a | timing look up table |
| 1822b | waveform look up table |
| 1824 | acceleration/deceleration table |
| 1826 | transistors |
| 1828 | LRC filter |
| 1830 | magnet |
| 2100 | motor |
| 2106 | alignment key |
| 2120 | transverse winding channel |
| 2125 | foldback winding |
| 2130 | permanent magnets |
| 2135 | air gap |
| 2150 | magnetic flux pole pieces |
| 2160 | rotor disc |
| 2166 | alignment slot |
| 2168 | alignment disc |

Inert and inert material: Materials that do not respond to the force of the magnetic field produced by the plural magnets.

The present invention is a continuation-in-part of U.S. patent application Ser. No. 12/371,823 filed on Feb. 16, 2009 which is a divisional application of U.S. patent application Ser. No. 11/731,427 filed on Mar. 30, 2007 which is a continuation-in-part of U.S. Pat. No. 7,492,074 titled High Efficiency Wheel Motor Utilizing Molded-Magnetic Flux Channels with Transverse-Wound Stators that issued on Feb. 17, 2009 of the same inventor and which are incorporated herein by reference.

The molded magnetic flux Channel™ pole pieces described in '823 are designed to capture and focus substantially all of the magnetic flux being emitted by the transverse coil winding, which increases motor efficiency, torque and power. Performance of motors so equipped is superior to ordinary motors. However, the powder metal molding process uses materials that are expensive. In an effort to use materials that can be ordinary commodities, a novel design of the present invention, along with a process for producing the new parts with greatly reduced manual labor costs is described.

Other components of the motor remain unchanged, except for the stator assemblies. While the '823 stators are produced by sandwiching the transverse wound coil between two halves of the molded magnetic flux Channel™ pole pieces, the stator according to the present invention uses a novel method of manufacturing to achieve approximately the same magnetic performance improvements. The design of the magnetic flux channels has been improved to decrease the cost of material and assembly. The outer steel shell can be replaced with other inert materials such as fiberglass or carbon fiber and the driving electronics have been improved.

The methods, systems and apparatus of the present invention provides a high efficiency direct drive high torque motor utilizing wound magnetic flux channel pole pieces composed of layered strands of insulated iron or other similar wire, or amorphous tape. As described in detail below, the novel motor can be configured for both a three stator motor or a single stator motor and includes simplified building blocks for construction of the motor.

The wound stator begins with the inert stator form 100, which is a type of framework with which the other parts are built around. The inert stator form does not do any work, and a portion of the form is later milled away to produce the gar gap between parallel pole pieces of opposite polarity.

FIG. 1 is an exploded view of the four main components of the wound magnetic flux channel stator of the present invention. As shown, the parallel pole motor 1000 includes four main parts—the inert stator form 100, the coil bobbin 105, the transverse coil winding 104, and the wound magnetic flux channel 106 composed of layered strands of insulated iron or other similar wire, or amorphous tape. In FIG. 1, the coil bobbin 105 is shown as an assembled bobbin 103 with the transverse coil winding 105.

In a preferred embodiment of the present invention, the inert stator form 100 is composed of a strong, inert material, such as plastic, which is molded to the shape needed to form the spaces between the adjacent magnetic pole pieces of the stator. The inert stator form is easily molded by injection molding, or "printed" from rapid prototyping. The inner surface of the stator form 100 is a round rim having diameter designed to fit the assembled coil winding bobbin 103 outer dimensions, which is also made from an inert material. The outer perimeter surface of the inert stator form 100 includes plural "place holders" referred to as teeth 101 which will deflect the magnetic flux carrying wire or tape away from the pole surfaces, while the wire or tape is being wound to form the wound magnetic flux channels 106 shown in their would condition in FIG. 1.

In the stator of the present invention, the transverse wound coil winding 104 is wound on a close fitting coil winding bobbin 105, using conventional or automated coil winding machinery to produce the assembled bobbin 103. After the transverse coil winding 104 is wound on the coil bobbin 105, using a conventional winding machine, the completed coil bobbin 103 with its winding are bonded to the inner surface of the final inert stator form 100. As shown in FIG. 1, the inert stator form 100 is composed of an inner rim 104 with teeth 101 protruding from the inner rim that correspond to the spaces between the pole pieces to be wound on the inert stator form 100 with the assembled transverse coil 104 in its bobbin 105 as shown in FIG. 1 as an assembled bobbin 103. Then the inert stator form with attached transverse coil bobbin is inserted into a newly invented motion programmable fixture, or winding machine, capable of precisely advancing or retarding the motion of the inert stator form assembly, while a modified Toriod winder 200 winds wire or tape into the spaces between the teeth 101 on the out rim of the inert stator form to form the wound magnetic flux channel pole surfaces.

Figure 2:
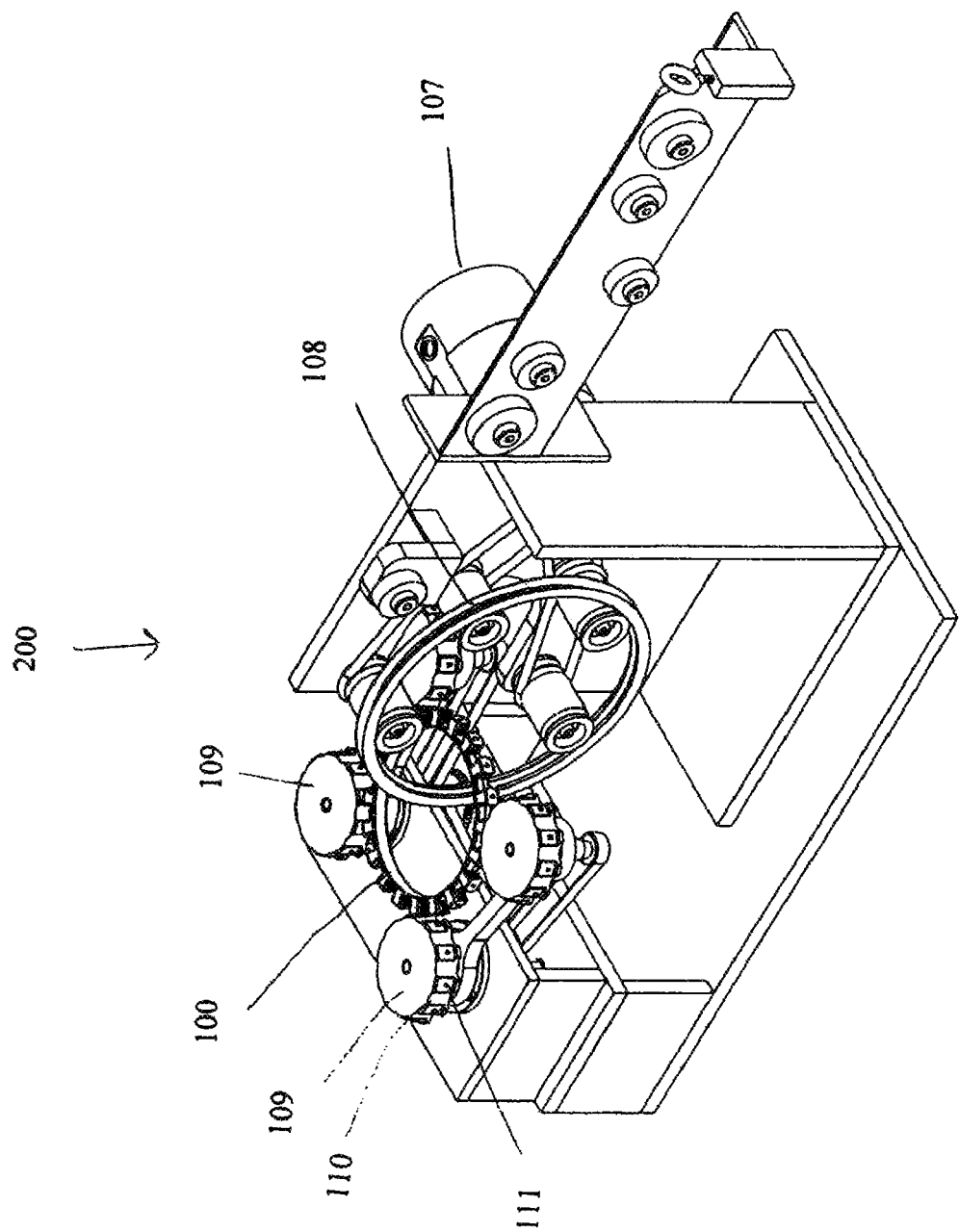
FIG. 2 is a perspective view of an example of a staged winding machine with an inert stator form installed for clarity.

FIG. 2 is a perspective view of an example of a staged winding machine 200 with an inert stator form 100 installed for clarity. The teeth 101 of the inert stator form 100 contain round keying, or alignment, holes 102 to facilitate the winding of the soft iron wire, amorphous tape or wire, or equivalent, by a specially constructed, computer programmed type of staged winding machine 200 with a Toroid winder 109 shown in FIG. 2. In the Example shown, the staged winding machine 200 includes the Toroid winder 108, a computer driven programmable, reversible stepper feed motor 107 to drive the toroid winder that advances and retards the position of the inert stator form so that the wire or tape is distributed evenly. The staged winding machine 200 further includes a set of male keyed feed wheels 109 each having a keying pin 111 separated by a clearance spacing 110 that corresponds with the teeth 102 and keying holes 102 in each of the teeth 102 protruding from the rim of the inert stator winding form 100. Those skilled in the art will understand that alternative configurations of a staged winding machine with a Toroid winder can be used to complete the task of winding the wire on the inert stator form 100. This allows the male keyed guide wheels 109 and key pins 111 to turn the inert stator form 100 assembly as the iron wire, tape or other material as it is wound on the inert stator form 100 using a wet epoxy or similar process.

Using the staged winding machine 200 the wire or tape, wound wet with epoxy, is applied in a shape which completely envelops the bobbin 103 containing the transverse coil winding 104, and then the layers of wire are compacted in the spaces provided in the inert stator form 100 between the teeth 101, each space corresponding a pole surfaces. This precise spacing and compacting is achieved by the precision indexing and precise motion in either direction provided by the precision stepper motors 107 controlled by the programmable CPU (not shown). A second preferred embodiment includes a process for mass producing wound magnetic flux channel stators with the winding assembly machine producing complete assemblies with minimal human operator attention, by using numerical controlled feed and harvest robots to load raw materials and remove and stack the completed wound magnetic flux channel stator assemblies.

Figure 3:
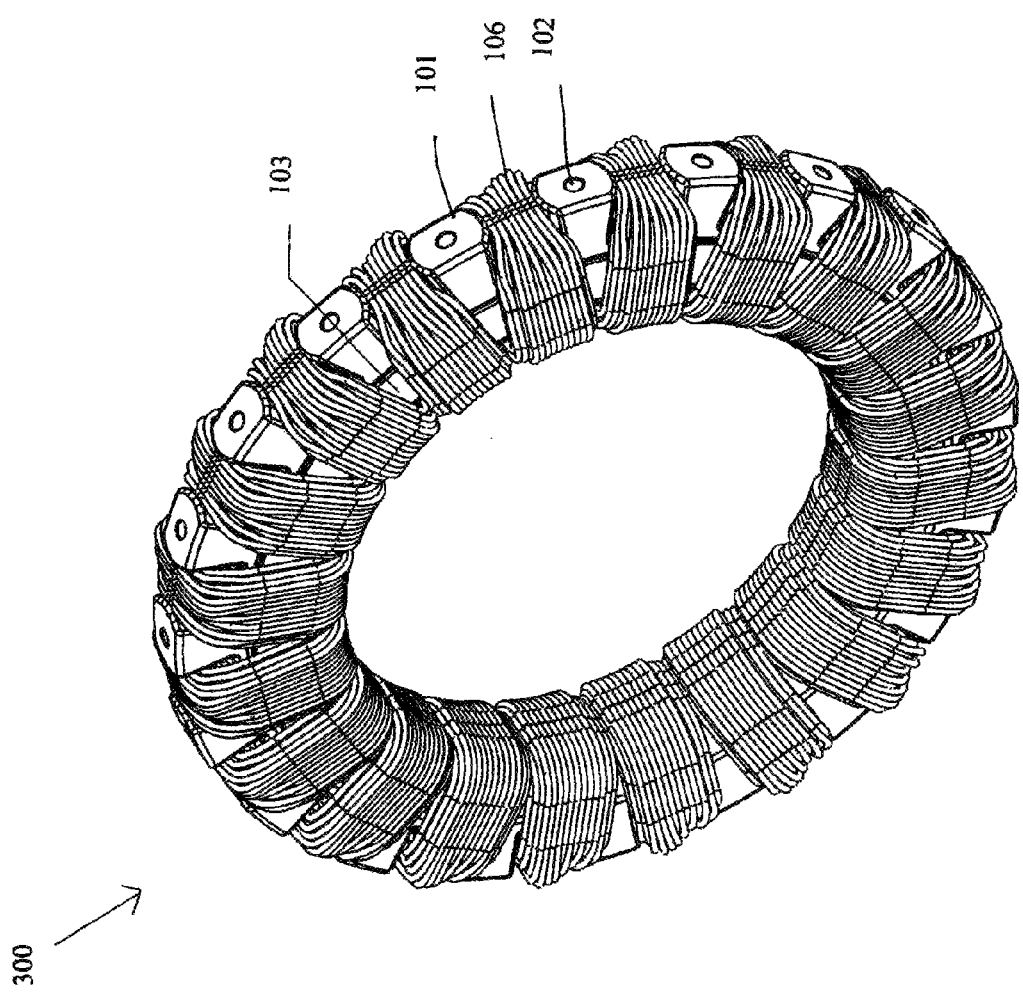
FIG. 3 is a perspective side view of a fully would stator after being removed from the toroid winder shown in FIG. 2 before pole surface shots are cut.
Figure 7:
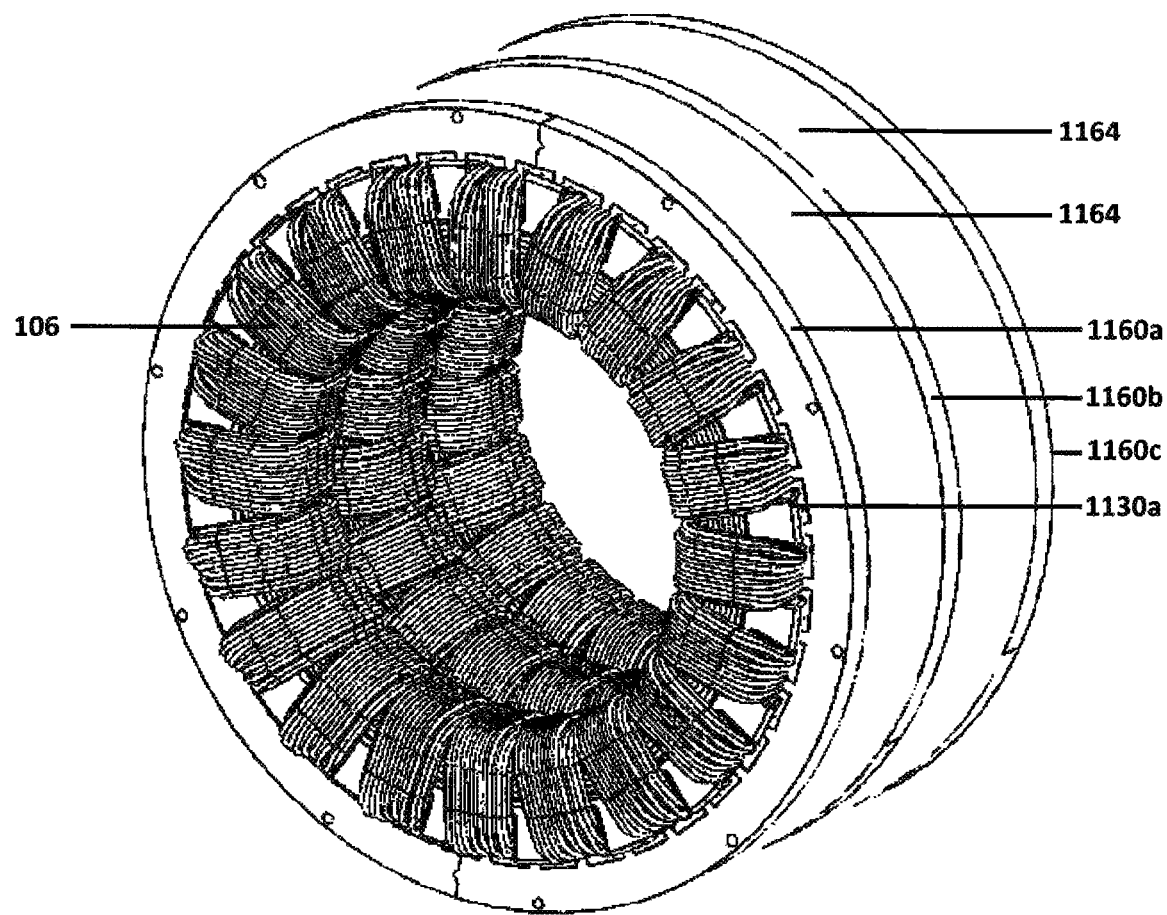
FIG. 7 shows a partial assembly including three stator assemblies, three rotor discs and two spacers with an electrical offset of approximately 120 electrical degrees.

After the inert stator form 100 has all the wire or tape wound for the wound magnetic flux channels for the complete revolution and the transverse wound stator coil 104 is encapsulated within the bobbin 103, the completed assembly is removed from the winding machine 200. FIG. 3 is a perspective side view of a fully wound stator after being removed from the winding machine shown in FIG. 2 before the wound wire is cut to form the parallel pole piece. As shown in FIG. 3, the fully wound stator 300 includes the assembled bobbin 103 with the stator winding wound on the bobbin 105. After the winding operation is completed, the completed inert stator form 100 and assembled winding bobbin 103 is mounted on its hub, usually in pairs or in threes as shown in FIG. 7, with the proper spacing to allow for either 90 electrical degrees of spacing or 120 degrees of electrical spacing, or other electrical spacing appropriate to the number of phases being used.

After the epoxy is hardened, completed wound stator assembly 300, with its hub, is mounted in a concentric grinding fixture (not shown), and the air gap 115 is cut into the wound stator assembly 300. The spacing of the air gap 115 between the pole pieces is ground to the precise distance needed for assembly of the permanent magnet ring with its magnets, plus the desired air gap between each side of each magnet and its corresponding pole piece. In the process, most of the inert teeth 101 from the inert stator form 100 are removed, including the female keying holes 102 used by the special winding machine 200. The completed stator assembly is then installed with additional Stator Assemblies to its non-rotating hub, and timed according to the number of phases for the motor or generator, and the epoxy is allowed to harden.

Figure 4:
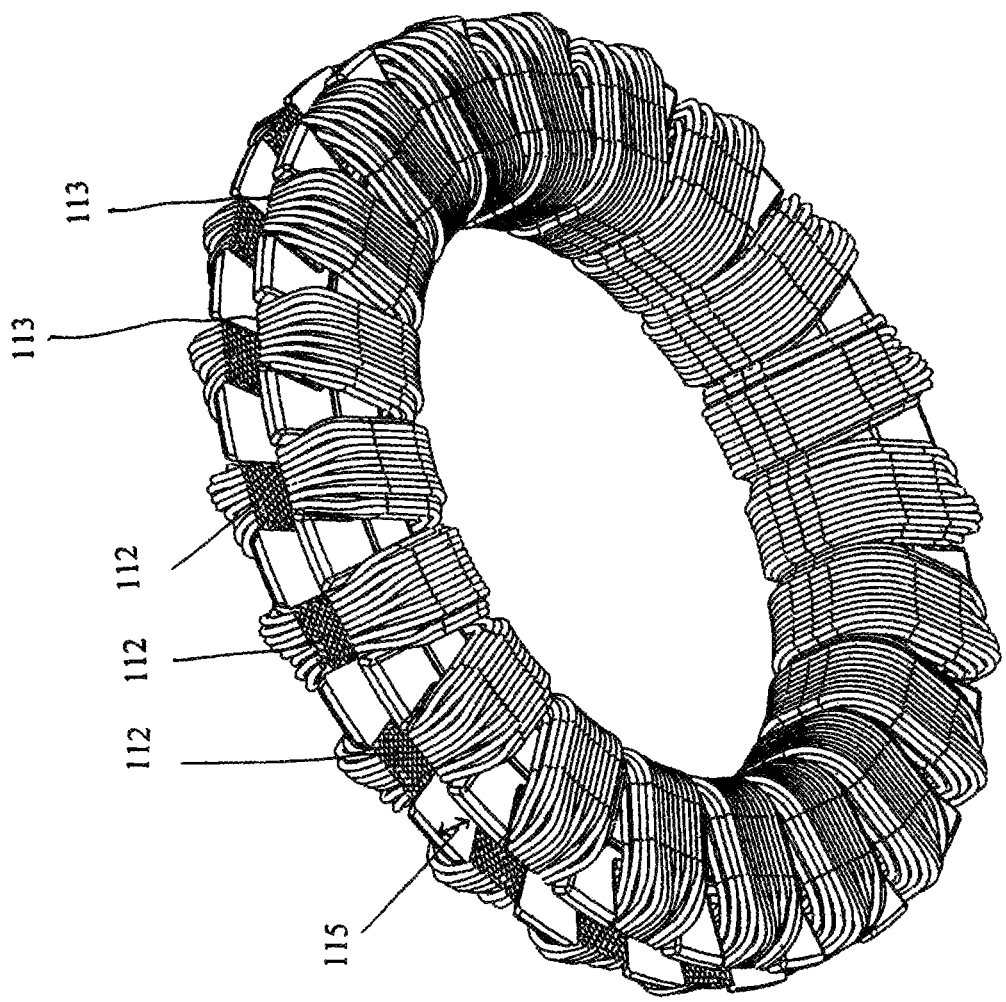
FIG. 4 is a perspective side view of the fully would stator shown in FIG. 3 after the magnetic pole surfaces have been removed.

FIG. 4 is a perspective side view of the fully would stator shown in FIG. 3 after the magnetic pole surfaces have been removed. FIG. 4 shows a ring of adjacent parallel pole pieces separated by a gap 115. The parallel pole pieces include adjacent pole pieces 112 each having a first magnetic polarity and corresponding adjacent pole pieces 113 each having a magnetic polarity opposite the polarity of the first pole pieces 112. The opposite magnetic polarity pieces are separated by the air gap 115 for the ring of permanent magnets.

Figure 5:
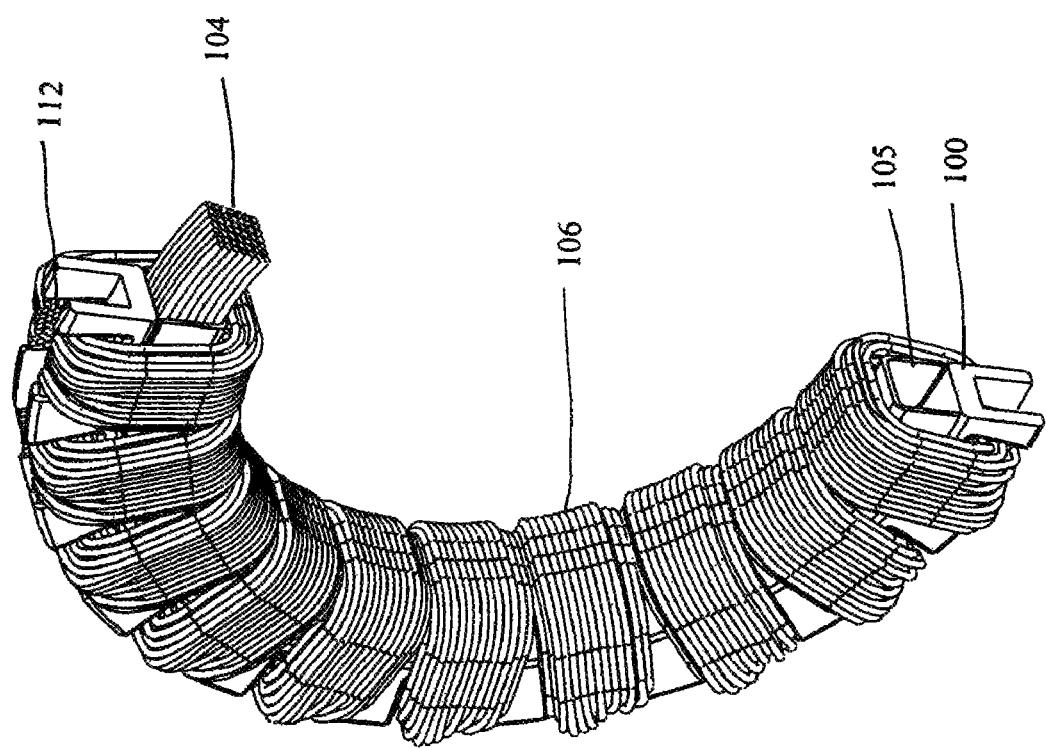
FIG. 5 is a cutaway side view of the fully would stator of FIG. 4 showing the transverse winding.

FIG. 5 is a cutaway side view of the fully wound stator of FIG. 4 after the magnetic pole surfaces 112 and 113 have been cut, showing the internal parts of the assembly. As shown, the transverse winding 104 in the bobbin 105 surrounded by the remaining stator form 100 and bonded magnetic pole pieces 112 and 113.

As described, the electric motor or generator of a preferred embodiment of the present invention includes a transverse wound stator produced using an inert pole spacer form 100 (FIG. 1), a transverse coil winding 104 wound on a coil winding bobbin 105, and wound magnetic flux channels 106 wound of layers of strands of insulated soft iron wire or amorphous alloy tape or wire, in which the wound magnetic flux channels are shaped to enclose the transverse winding to capture substantially all of the flux emitting from the transverse coil winding, and focusing that captured magnetic flux to the pole piece surfaces 112 and 113 of the wound magnetic flux channel 106, so that the flux maximally interacts with the permanent magnets in the moveable magnet ring which drives the rotor of the motor/generator.

Figure 6:
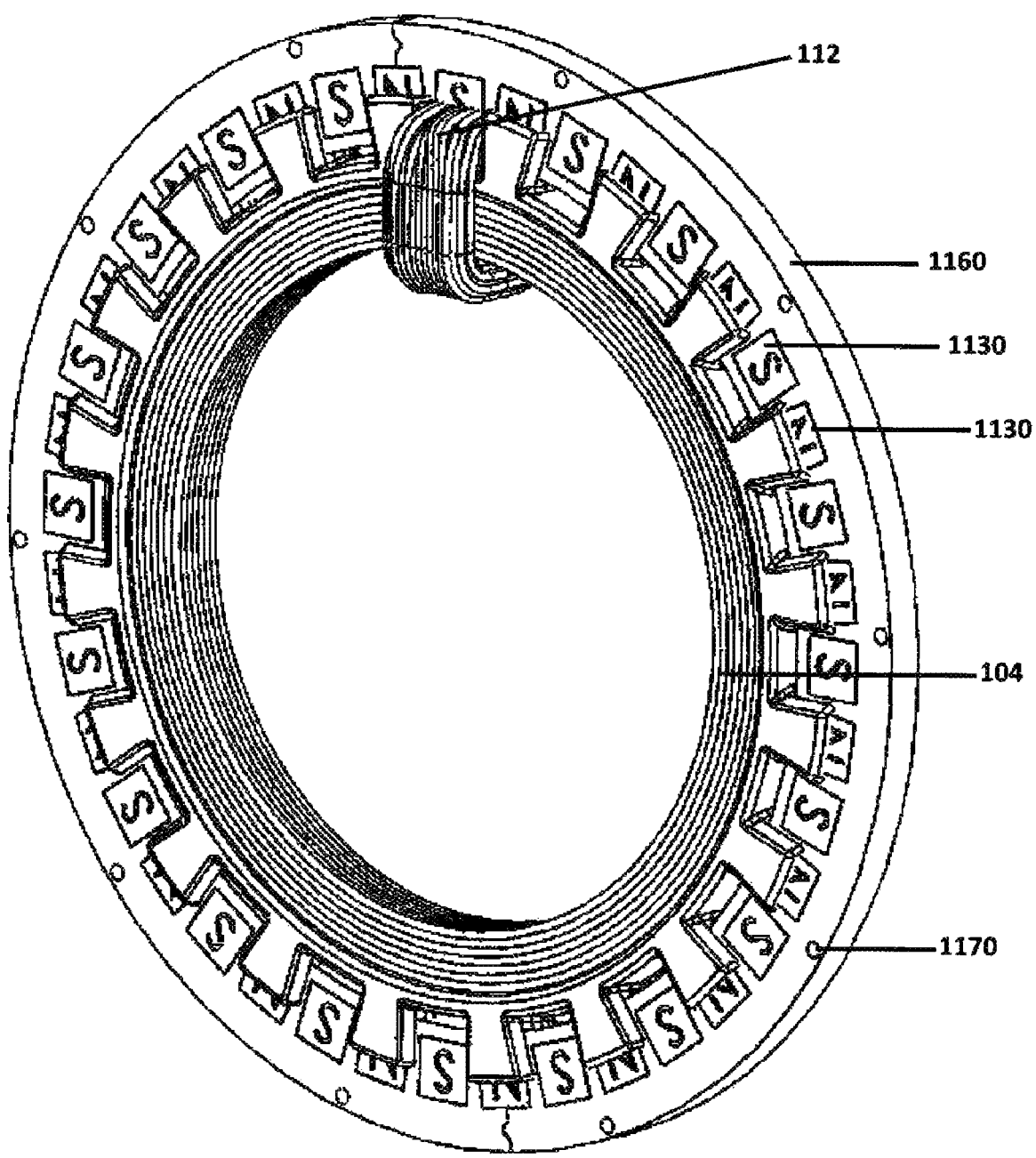
FIG. 6 shows an isolated rotor disk assembly showing the relationship between the bonded magnets, one pair of mating molded magnetic flux channel pole pieces and one transverse wound stator winding.

FIG. 6 is a perspective side view of the isolated rotor disk 1160 assembly showing the relationship between the bonded magnets 1130, one pair of mating molded magnetic flux channel pole pieces 1212 and one transverse wound stator winding 1120. The permanent magnets 1130 are flush mounted and bonded into slots which can be abrasive water jet machined into a plastic or composite material rotor discs. The plural permanent magnets 1130 can be bonded in place within the rotor disc 1160, alternating in polarity between north and south, with each permanent magnet separated from adjacent permanent magnets by a distance. The spacing of the permanent magnets is increased to at least approximately 1.25 times the swept width of the magnet in order to reduce fringing losses. Although not shown, it is understood that each permanent magnet has a north end and a south end. In the preferred embodiment, the north and south polarity ends of the permanent magnets alternate around each side of the rotor disc 1160 with one end of the permanent magnets 1130 exposed on each side of the rotor disc 1160. The rotor disc also includes alignment and or fastener holes 170 closer to the outer circumference of the rotor.

Functionally, FIG. 6 shows an example of a mated parallel pole magnetic flux pole piece 1210 with the transverse winding 1120 running through the channel 1125. During rotation, each one of the mated pole pieces 1210a and 1210b passes over opposite ends, thus opposite polarities, of the same permanent magnet 1130. As previously described, the permanent magnet 1130 is positioned between adjacent parallel flat surfaces 112 and 113 shown in FIG. 4.

For manufacturing purposes, the rotor disc is a non-metallic such as a plastic rotor disc with magnet cavities or holes cut in the plastic disc for inserting the magnets with one polarity of the magnet flush with one side of the rotor disc and the opposite polarity flush mounted with the opposite side of the rotor disc. The magnets can be Neodynium-iron-boron permanent magnets inserted in the rotor disc magnet cavity cut out by a numerically controlled water jet abrasive cutter. Alternatively, those skilled in the art will understand that alternative materials can be used to fabricate the rotor disc such as, but not limited to, a composite material rotor disc of fiberglass or carbon fiber matrix, fitted with alternate pole Neodymium-boron-iron permanent magnets, in which the magnet cavity in the material is water jet machined. The permanent magnets are flush mounted and are bonded in place with epoxy or with cyanoacrylate anerobic adhesives. In a preferred embodiment, the flush mounted neodymium-iron-boron permanent magnets have radial spacing of at least 25% of the pole average face radial dimension.

For assembly purposes into the complete motor generator, in a preferred embodiment the rotor discs can be split into two or more identical segments and are joined together when the discs are assembled into the stator pole slots in the molded magnetic flux channels pole pieces. Additionally, the rotor disc spacers shown in FIG. 7 can be fabricated in split circles so that they can be assembled between the completed Rotor Disc Assemblies after being mated to the Stator Assembly. They are then fastened together with through bolts or can be bonded together.

the present invention replaces the outer steel drum with a built up stack of rotor disc assemblies and spacers. The spacers can also be split into two or more segments for later assembly in a complete circle. For assembly, fasteners are used to bolt the stack to the end plates for a complete rotor assembly. Alternatively, the complete assembly may be bonded together. The number of rotor discs can be one or more. One embodiment uses three rotor discs mated with three stator assemblies operating from three phase electrical input. Another embodiment of this invention uses a single rotor disc assembly, surrounded with three partial stator assemblies. The single rotor disc embodiment produces less weight, less torque, and higher speed, and is suited for lighter weight wheel motors.

FIG. 5 is a perspective side view showing a partial assembly of a three stator assembly including three rotor discs 1160a, 1160b and 1160c and two spacers 1164 with an electrical offset of approximately 120 electrical degrees. FIG. 7 also shows a perspective view of plural adjacent mated magnetic flux pole pieces 1210 forming a ring for housing the transverse winding 1120. As described in the parent '079 patent, in the three phase version of the present invention, either the stators may be offset 120 electrical degrees with the magnet aligned or the motor magnets may be offset 120 electrical degrees with the stators aligned. Mechanically, the offset depends on the number of poles per the following formula.

Offset=number of pole pairs/360×number of phases.

Thus for a 60 pole motor with three phases:

Offset=360/30=12 degrees divided by 3=4 degrees

Figure 8:
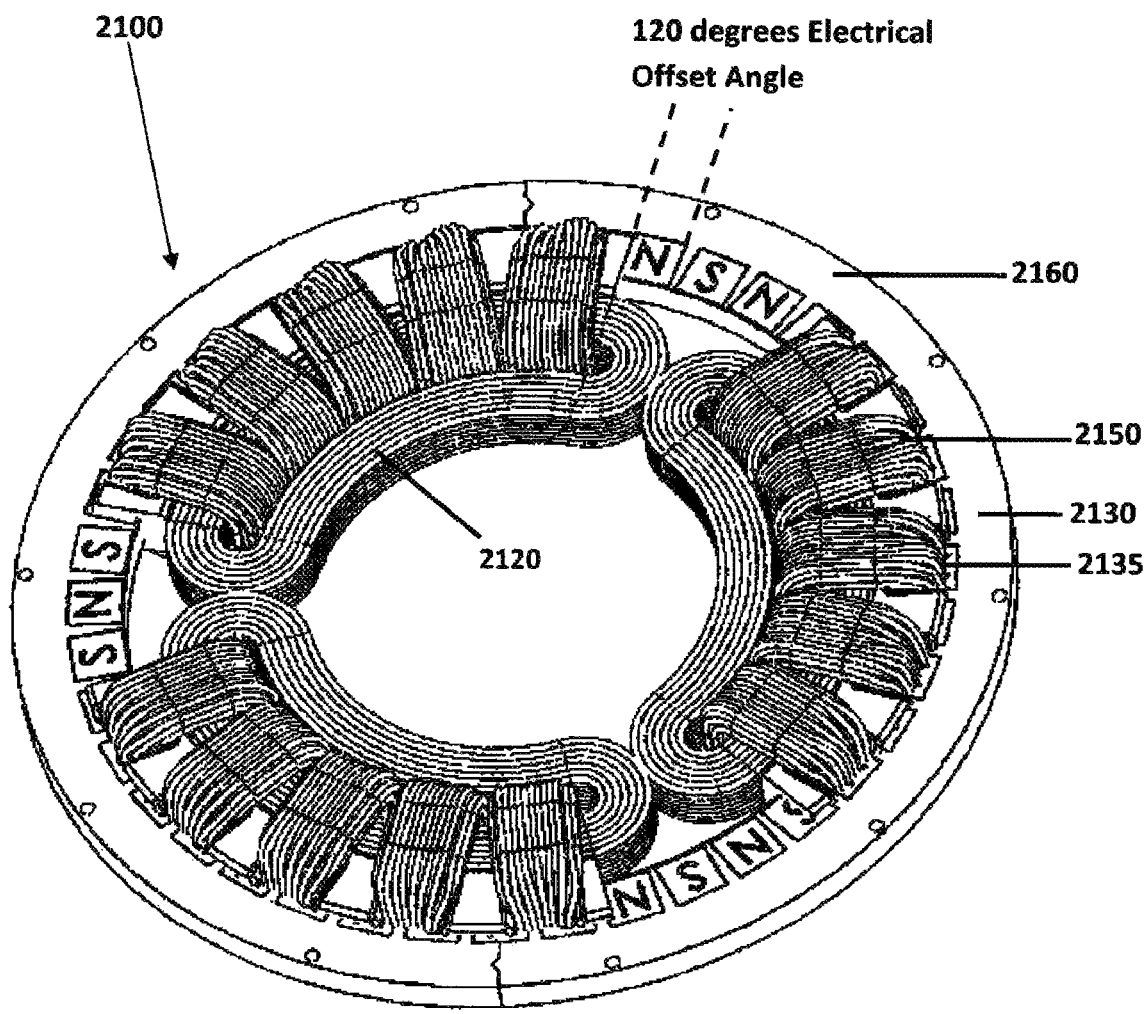
FIG. 8 shows an alternate embodiment using a 40 pole, single rotor disc assembly with three individual phase stator assemblies of five pairs of mated molded magnetic flux channel pole pieces, each individually transversely wound with fold back return windings.

FIG. 8 is a perspective side view showing an alternate three phase motor 2100 embodiment using a 40 pole, single rotor disc 2160 assembly with three individual phase stator assemblies of five pairs of mated molded magnetic flux channel pole pieces, each individually transversely wound with foldback return windings. Similar to the previous embodiment, the rotor disc 2160 includes plural permanent magnets 2130 alternating in polarity.

Each phase includes a set of magnetic flux pole pieces 2150 that form the transverse winding channel 2125 for housing a corresponding transverse winding 2120 that "folds back" forming the return segment of the transverse stator winding 2120 that is not housed within the winding channel 2125. In this embodiment, the path of the transverse winding travels through the transverse winding channels in the molded magnetic flux pole pieces and returns folded back against the base of the molded magnetic flux pole piece, so that the magnetic flux of the foldback return is also captured into the molded magnetic flux pole piece. Each of the three partial stators are separated from each other, both magnetically and electrically. The electrical offset angle in this example is approximately 120 degrees.

While it has long been known that the best voltage waveform to efficiently drive a permanent magnet motor is quite different with different speeds and power loadings, an effective means of varying the timing and waveform has not previously been known. Because of the finite time required to build a magnetic field, the required voltage must be applied sooner (more advance) as the motor speed increases. The optimal waveform can vary from DC at stall, to a square wave at low speed and to a modified sine wave at higher speed.

In the 19th century George Henry Corliss discovered with steam engines, that 30% more efficient operation resulted from shutting off the steam earlier in the power cycle and allowing the steam to further expand within the cylinder. Similarly, in the inductive load in the stator of a permanent magnet motor, it is desirable to cut off the applied voltage earlier in the working cycle of the stator, and allowing the captured decaying magnetism to continue working in the electrical cycle without additional energy input.

The present invention includes a novel method of selecting the timing and optimal applied voltage waveform for approximately all speed ranges and power ranges. The optimal timing and waveform in the preferred embodiment was determined by careful calibrated testing of prototypes and the resulting data is stored in non-volatile memory for future use. According to the present invention, feedback information to the central processing unit confirms and allows "on-the-fly" corrections to be made in the voltage waveform applied to the motor's stator coils during operation. The motor driving electronics provide full wave current conduction at stall to low speeds, transitioning to double-acting limited current conduction angle at high speed.

Figure 9:
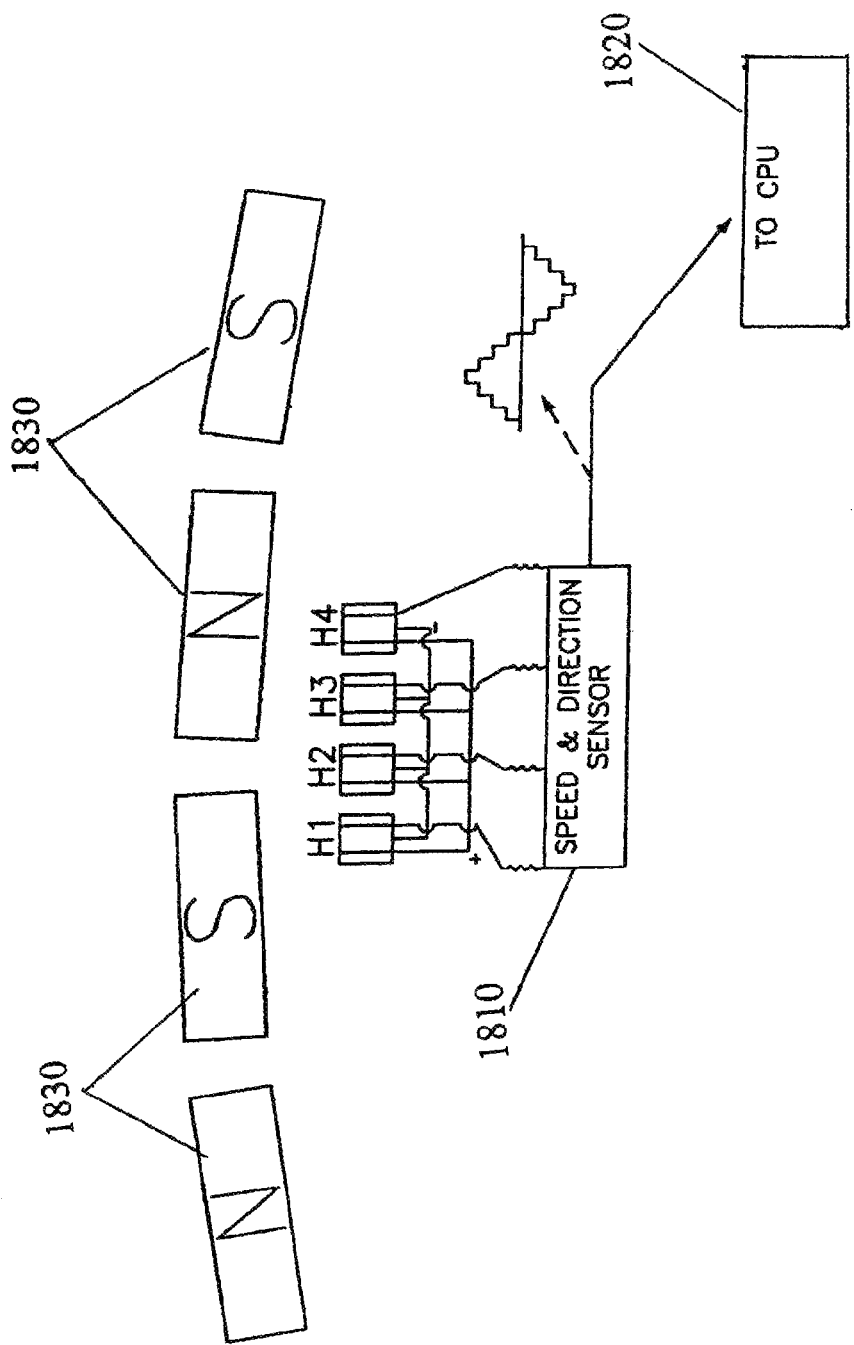
FIG. 9 shows a timing, direction and speed magnetic flux detector. In one embodiment, a plurality of detectors are positioned near the plane of the rotor magnets to accurately measure, the timing, speed and direction of movement of the Rotor.

The driving electronics to drive the motor utilize timing, direction and speed magnetic flux detectors. FIG. 9 shows an example of a timing, direction and speed magnetic flux detectors 1810 according to a preferred embodiment of the present invention. Those skilled in the art of electronics will understand that alternative devices for be substituted for detecting the timing, speed and or direction of the rotor such as optical detectors. In a preferred embodiment, the magnetic detection module includes a plurality of ratiometric, balanced null Hall Effect sensors in close proximity to one another. In the example shown, four to sixteen individual sensors can be used although four are shown, labeled as H1, H2, H3 and H4 in figures for clarity. As the magnetic field of a north pole magnet approaches the magnetic detection module 1810, sequentially each sensor's output changes from a midpoint voltage to a full positive voltage. The outputs are combined with summing resistors. As the sensors H1-H4 switch to full on, the first 90 degrees of the first 90 degrees of the stair step sine wave shown in FIG. 9. As the magnetic field of the north pole magnet passes away from the module 1810, one by one the sensors H1-H4 switch to mid voltage again. This creates the second 90 degrees of the stair step sine wave.

Then, as the adjacent south pole of the magnet approaches, each of the sensors H1-H4 is sequentially switched to zero voltage. This creates the third 90 degree portion of the stair step sine wave. And finally, as the south pole of the magnet moves away from the module 1810, each sensor H1-H4 is switched to mid voltage position, generating the final 90 degree portion of the stair step sine wave. The stair step sine wave output from each module is fed to the controller 1820 central processor unit (CPU), which provides accurate information of speed, direction and a choice of timing advance signals.

Figure 10:
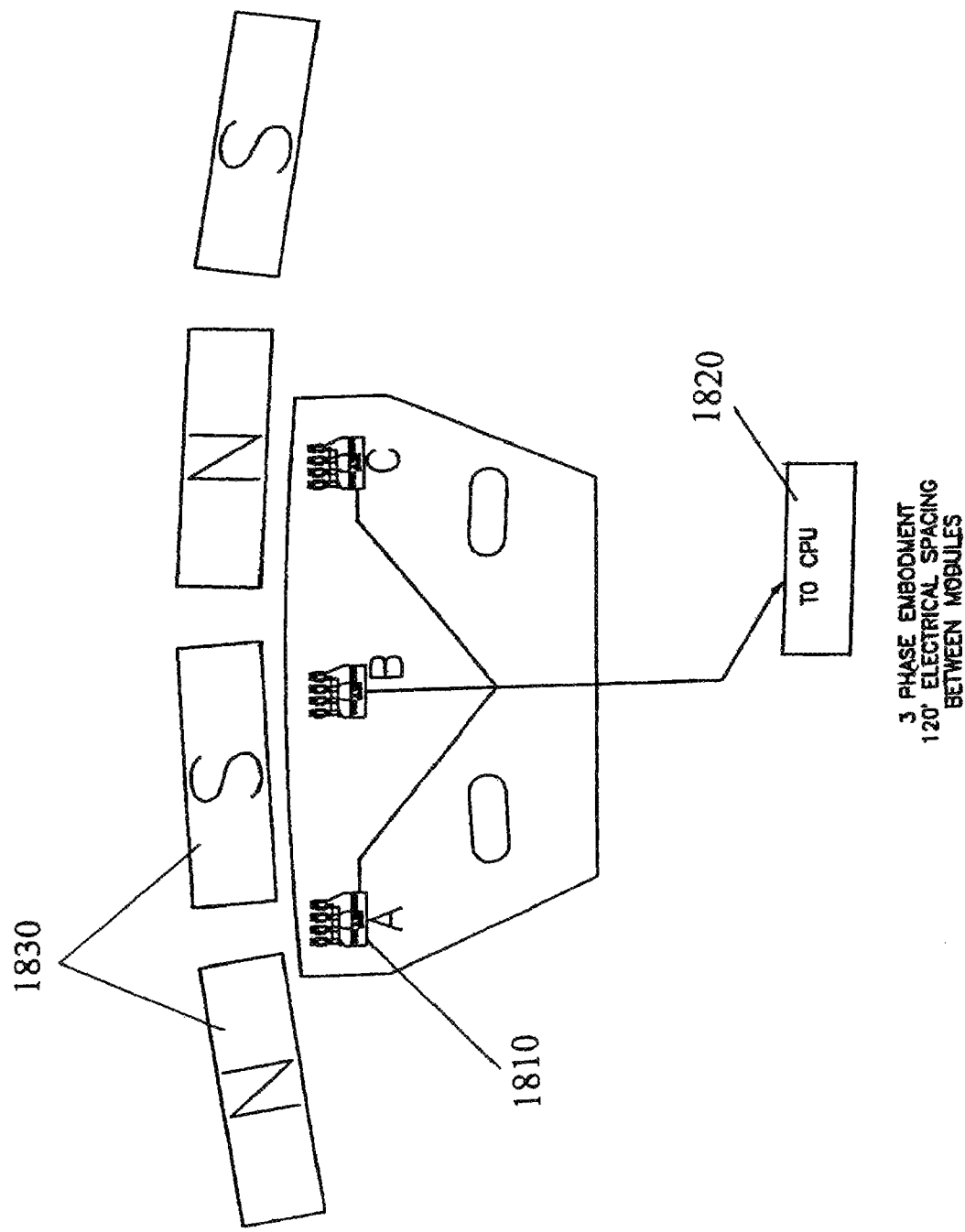
FIG. 10 shows three timing, direction and speed magnetic flux detectors positioned at approximately 120 electrical degree spacing and mounted on a moveable plate to allow for manual timing adjustments.

In the embodiment shown in FIG. 10, a plurality of the timing, direction and speed magnetic flux detectors 1810 are positioned near the plane of the rotor magnets 1830 to accurately measure the timing, speed and direction of movement of the rotor to determine feedback data for "on-the-fly" corrections. FIG. 10 shows three timing, direction and speed magnetic flux detectors positioned at approximately 120 electrical degree spacing and mounted on a moveable plate to also allow for manual timing adjustments.

Figure 11:
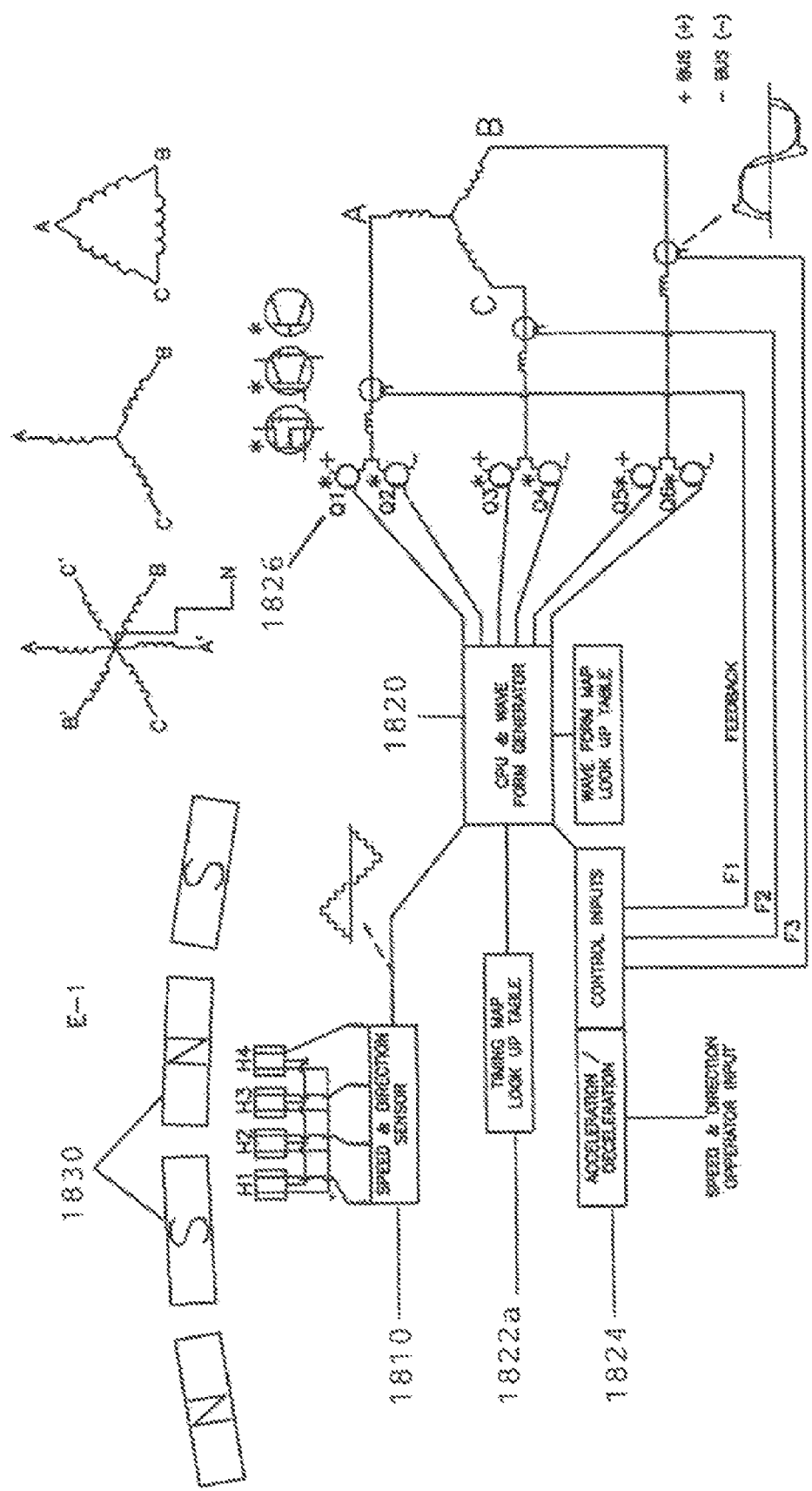
FIG. 11 is a block diagram of the electronic control of the motor with the stator windings in a Wye or Delta configuration.

The detected data is transmitted to the central processing unit within the controller 1820 for processing to determine the timing and optimal voltage waveform to be applied to the motor for the desired speed and power during operation. As previous described, a database containing optimal timing and waveform data corresponding to desired operation is stored in nonvolatile memory as a timing map lookup table 1822a and a waveform map look up table 1822b as shown in FIG. 11. The detector data can be used to compare the detected data with the stored optional voltage and waveform data for compensation or feedback data for "on-the-fly" corrections.

The controller's 1820 central processing unit also receives input signals from the speed and direction user controls, the magnetic motion detectors, the current feedback sensors and other safety sensors. The central processing unit is coupled with a digitally stored data look up table 1822a and 1822b. The waveform look up table 1822b contains a selection of optimal waveforms, digitally stored, for various speed, direction, and power ranges. The acceleration/deceleration table 1824 contains digitally stored, optimal rates for increasing or decreasing speeds. The timing look up table 1822a contains, digitally stored, optimal timing advance values for various speeds, accelerations, and power levels. The waveform lookup table can be stored in flash memory and be updateable.

After determining the desired speed, direction, and acceleration for the motor, the CPU downloads the optimal waveform, timing, required, and generates the plurality of phase signals to drive the switching transistors 1826 with an appropriate pulse width modulated waveform. This waveform is appropriate for the RPM and power level selected by the operator input device. The switching transistors 1826 may be Silicon Carbide MOSFETS, IGBT's, GaS, or other commercially available devices. In one embodiment, Silicon Carbide MOSFET's are preferred so that higher switching frequencies may be used, in addition to the lower switching losses for this device. The higher switching frequencies also enable more effective high frequency filtering.

Figure 12:
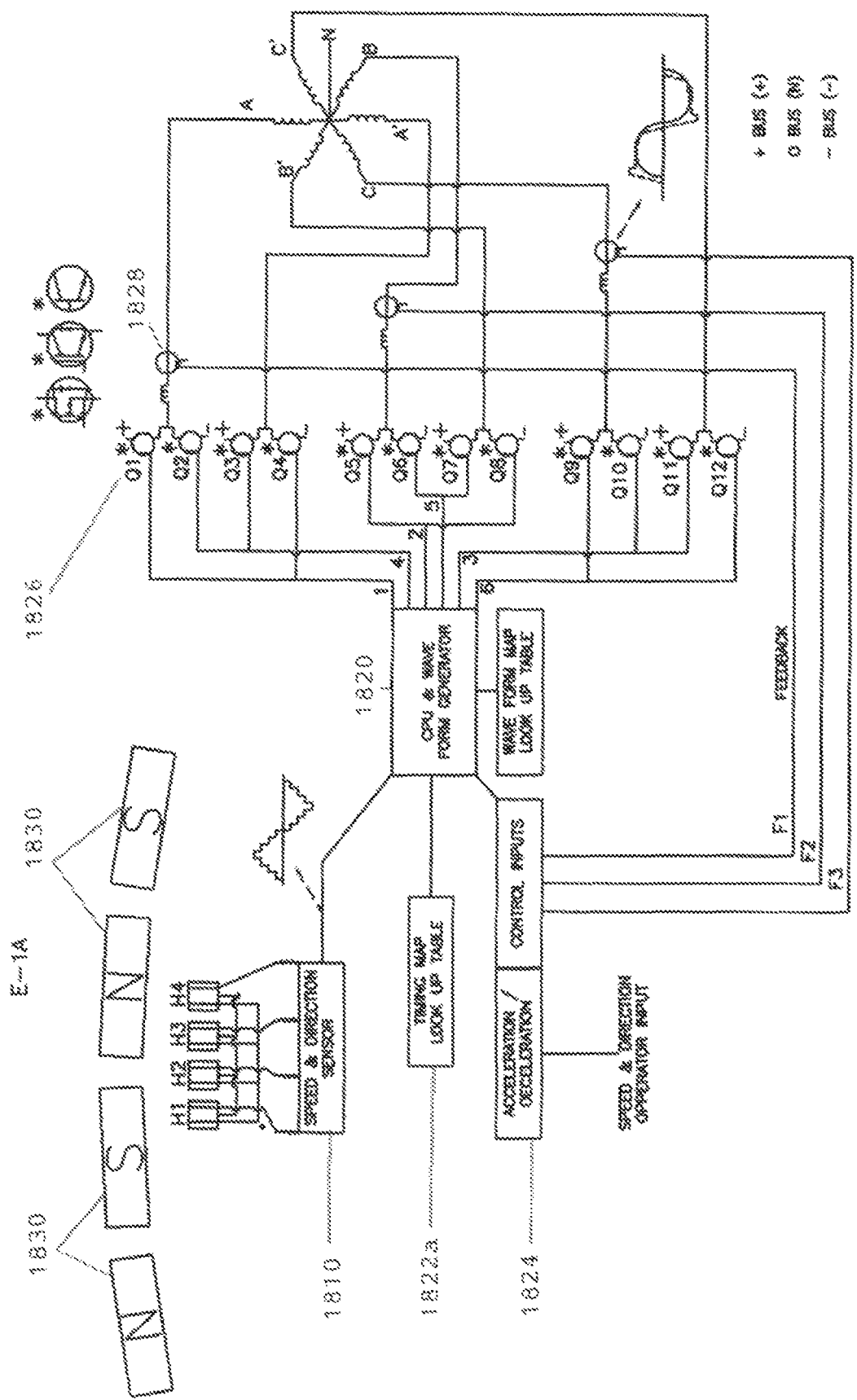
FIG. 12 is a block diagram of the electronic control of the motor with the stator windings in a STAR configuration.

The electronic control of the motor is quite different than conventional means. The Motor may be connected in Wye, Delta or Star arrangement. Wye or Delta connections can be driven by the same electronic arrangement, and Star requires a different arrangement. FIG. 11 is a schematic block diagram of the electronic control of the motor with the stator windings in a Wye or Delta configuration. FIG. 12 is a schematic block diagram of the electronic control of the motor with the stator windings in a STAR configuration.

As shown in FIGS. 11 and 12, an LRC filter 1828 is fitted to the outputs of the switching transistors 1826 to remove harmful switching AC noise prior to the output waveform being fed to the stator coils of the motor. This reduces degradation of the magnetization saturation characteristics of the molded magnetic flux channel pole pieces, reduces hysteresis losses in the magnetic materials increases torque and efficiency. Motors connected in either Wye or Delta configuration can be driven from electronics using six switching transistor circuits as shown in FIG. 11, while motors connected in Star configuration require additional components as shown in FIG. 12. Circuitry is similar except for additional transistor switches, a power supply having an positive, negative source and neutral voltage supply.

After filtering, the outputs of the switching transistors are fed to the appropriate motor Stator Windings. Feedback is provided to the CPU by current and waveform detection modules 1810 which can be either Hall effect devices or current transformers. Current and waveform feedback are used to modify the driver outputs of the CPU to allow for current limiting, waveform repair, switching transistor temperature limiting, short circuit limiting, and other typical safety limitations.

In the star configured embodiment shown in FIG. 12, where a higher speed motor operation is required, an over running fly-forward diode is placed in series with each power semiconductor switch so as to allow the motor's top speed reverse EMF to greatly exceed the available driving power supply voltage. In this embodiment, the conduction waveform of each power semiconductor is restricted to that portion of the cycle in which the power supply voltage exceeds the reverse EMF of the stator winding. Above that voltage, the over running fly-forward diode allows the remainder of the increasing voltage waveform to free wheel in disengaged mode. With the power semiconductor switches and series connected over-running fly-forward diodes in the driving electronics the driving voltage waveform powers the stator coil from zero to the maximum available from its power supply and which allows the waveform voltage to continue to rise above available voltage in free-wheel fly-forward mode.

In an embodiment, the power semiconductor switches feeding their respective stator windings are switched on and off one pulse for each half electrical cycle, feeding the appropriate voltage waveform to each individual phase winding from the output of a series voltage regulator. When power semiconductor switches feeding their respective stator windings are switched on and off one pulse for each half electrical cycle, the pulse and duration can be varied to control the motor speed and torque.

The over-running fly forward diodes also permit higher efficiencies because reverse conduction is blocked, this eliminating otherwise wasted energy; hysteresis losses from high frequency switching is more easily filtered out and therefore less heat is transferred into the stator windings and the magnetic circuit; and only DC or pulsating DC is furnished to the stator windings, at the appropriate timing of polarity, while the AC from pulse width modulation PWM is rectified and filtered, thus producing more torque with less heating.

The overrunning mode is applicable to embodiments such as highway operated wheel motors in which high cruising speeds trade higher speed for maximum torque, wherein at low speeds full torque is needed and available while not operating in over running mode.

Figure 13:
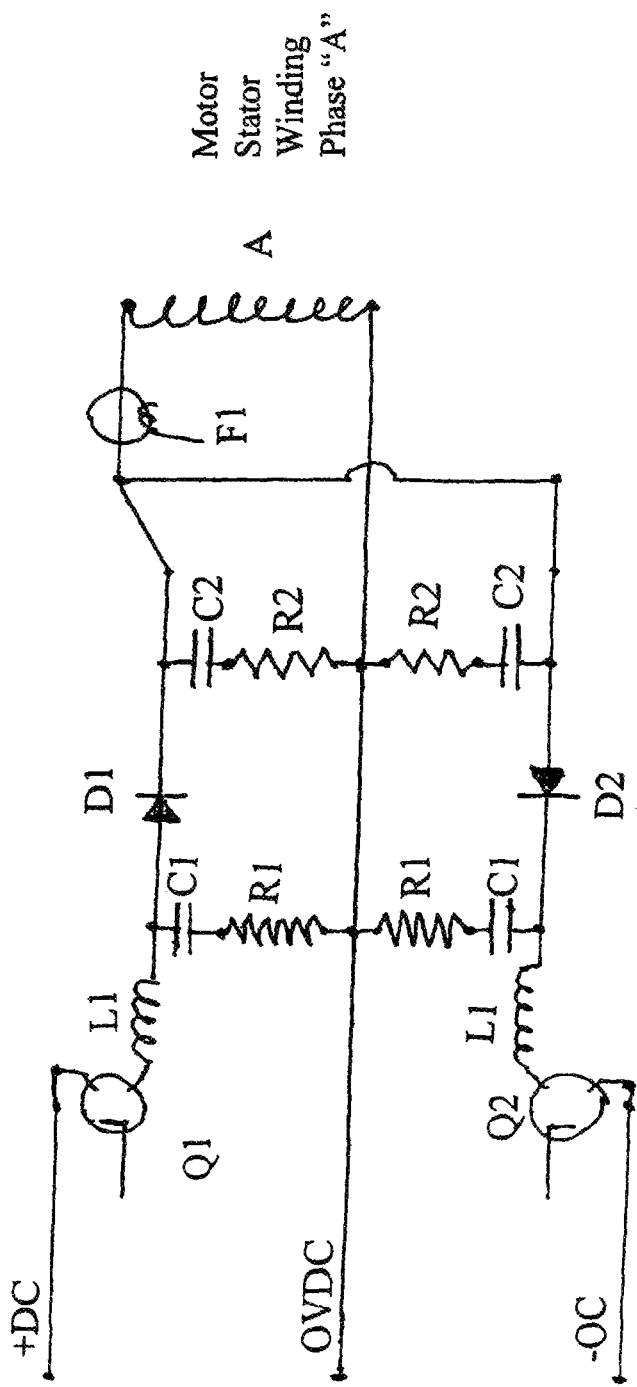
FIG. 13 is a block diagram of one output stage when the motor with the stator windings are configured in Star configuration.

FIG. 13 is a block diagram of one output stage when the motor with the stator windings are configured in Star configuration, showing the connection to one leg of the stator winding, with each positive and negative semiconductor switch S1 and S2 equipped with its series over running fly-forward diode D1 and D2 for an embodiment wherein the motor top speed must exceed the supply voltage available. The electronics of the output stages shown in FIG. 13 are duplicated three times to power a Wye (four wire) configuration stator winding, or are duplicated six times to power a Star (seven wire) configuration Stator. The two stage LRC filters (L1 and R1 C1 and R2 C2) on each side of the diodes D1 and D2 are also shown.

Figure 14:
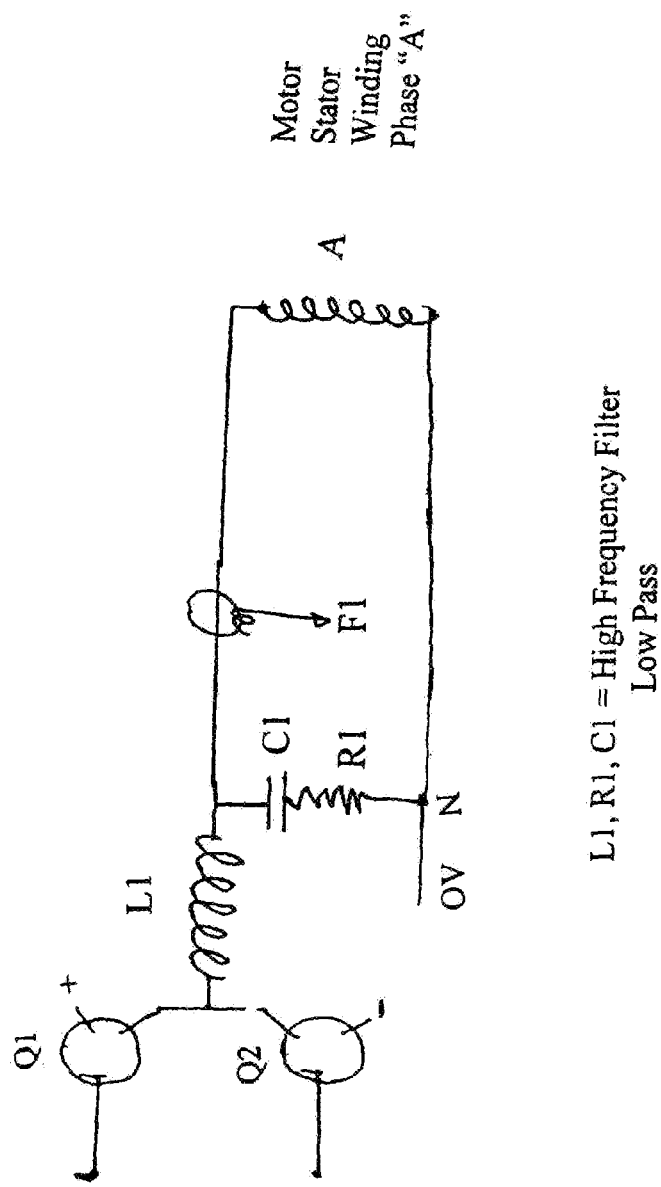
FIG. 14 shows an embodiment including LRC filters in an output circuit that filter out the high frequency semiconductor switching frequency without the over-running fly-forward diodes.

FIG. 14 shows an alternative embodiment of LRC filters that filter out the high frequency semiconductor switching frequency in an output circuit without the over-running fly-forward diodes.

Figure 15:
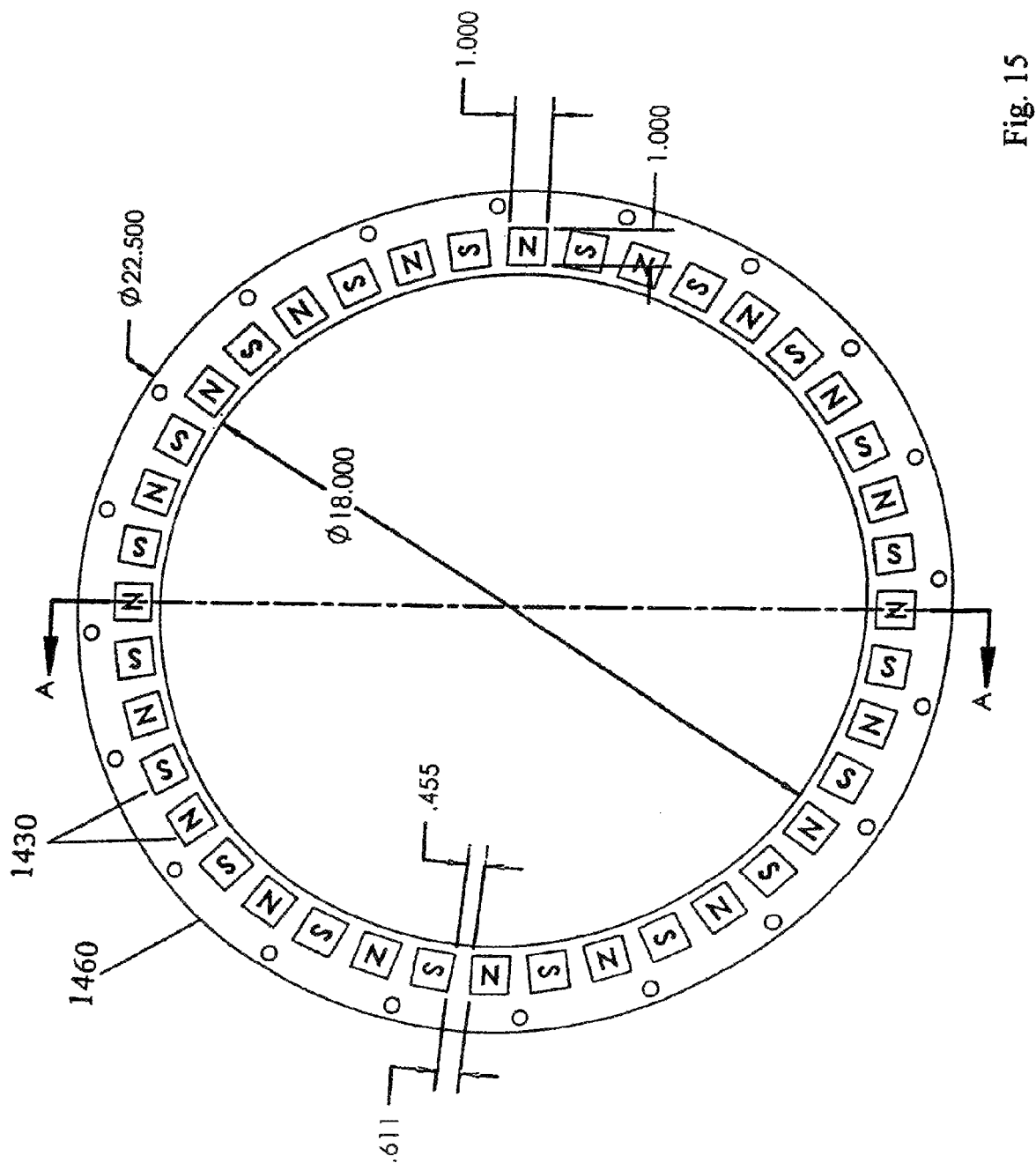
FIG. 15 is a front view showing a single rotor assembly according to the alternative embodiment shown in FIG. 8 showing the spacing of the magnets.

FIG. 15 is a side view showing a single rotor assembly according to the single rotor 1460 embodiment showing the spacing of the magnets 1430. In this embodiment, the radial spacing of the magnet poles is at least approximately 25% of the magnet face width to reduce magnetic flux fringing losses.

In an embodiment, the spacing of the permanent magnets is increased to at least 1.25 times the width of the magnet face to reduce flinging losses and the swept width of the molded magnetic flux channel pole piece is increased to approximately 1.25 times the magnet width in order to improve the motor torque and EMF waveform.

As just described, the remainder of the assembly of the motor or generator is similar to the co-pending '823 patent application as shown in FIG. 15 with the molded magnetic flux channels replaced by wound magnetic flux channels as shown in FIG. 1. In this example, the completed assembly is a wheel motor as described in the '823 patent application.

Figure 16:
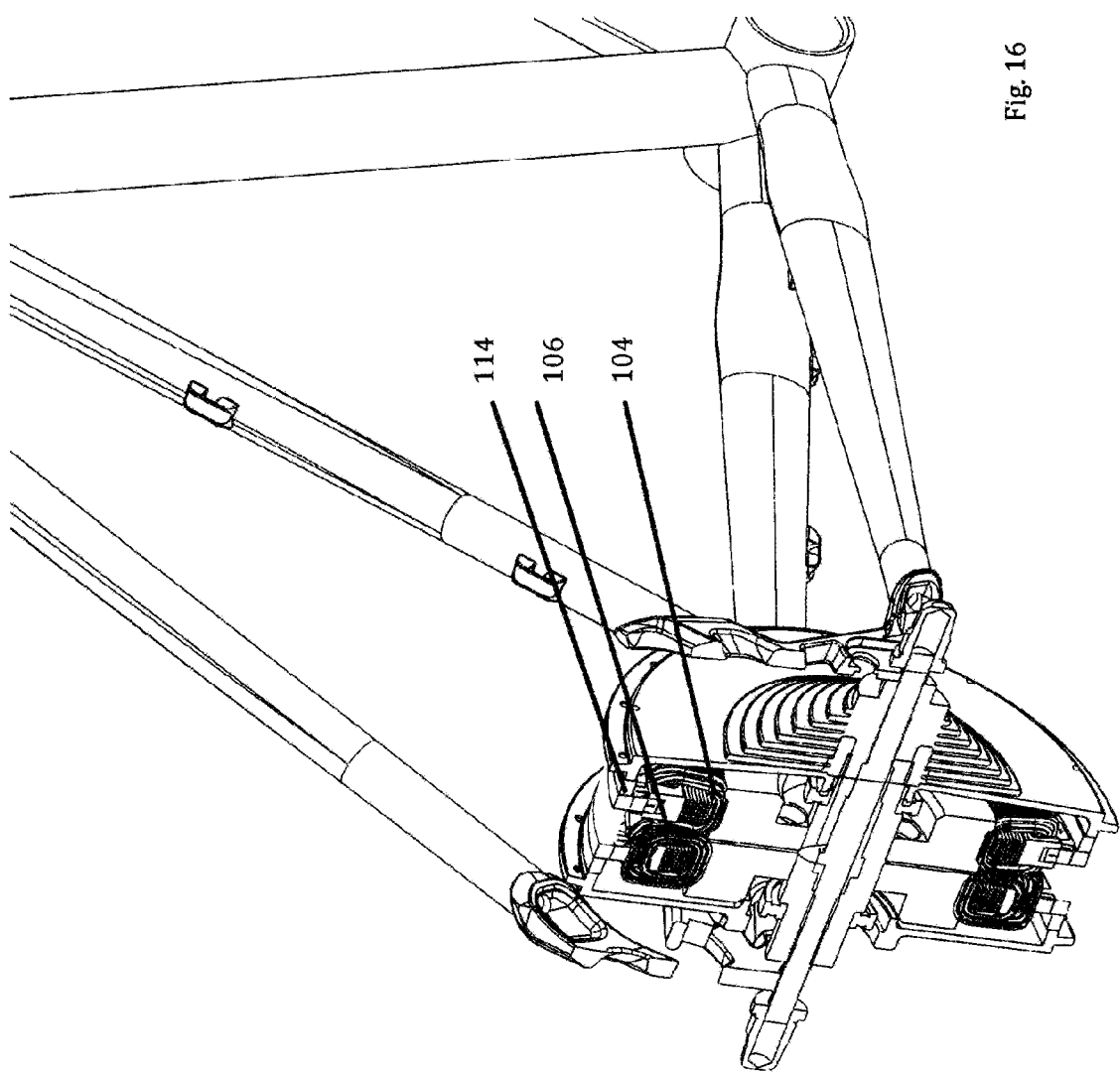
FIG. 16 is a cutaway view of the wound magnetic flux channel stator having two wound magnet flux channels, mounted on a bicycle frame.

FIG. 16 is a cutaway view of the wound magnetic flux channel stator having two wound magnet flux channels, mounted on a bicycle frame without the spokes and wheels as an example of a use for the motor. The magnet ring 114, containing mounted permanent magnets is shown in FIG. 6.

Figure 17:
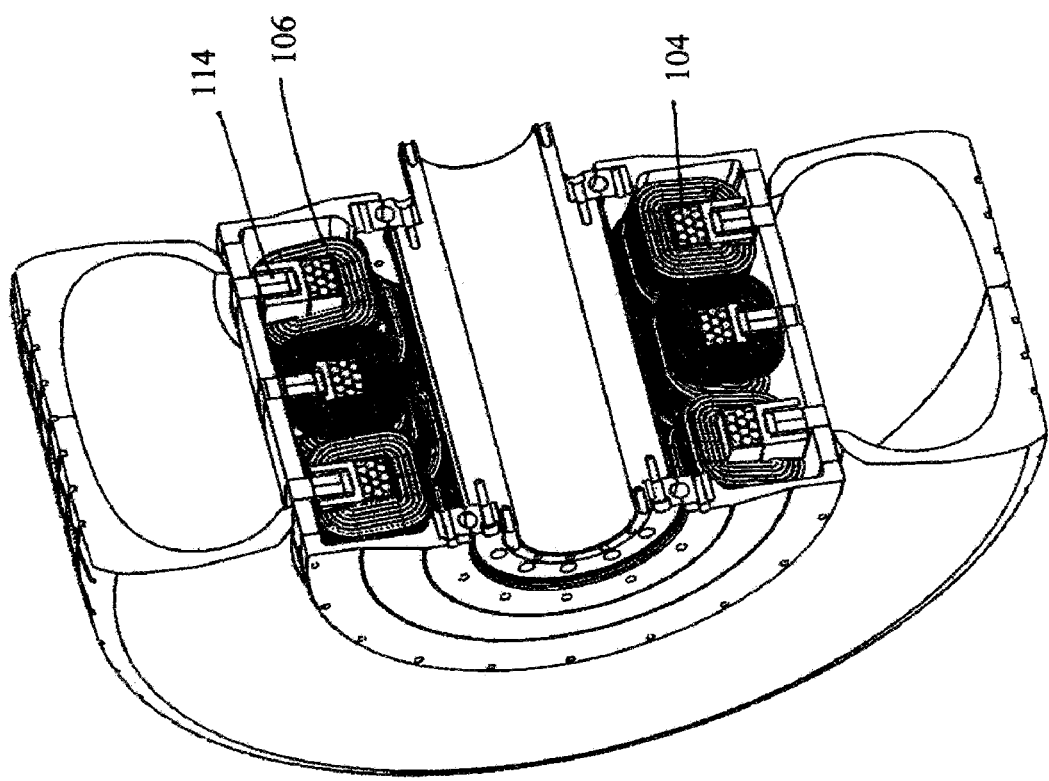
FIG. 17 is a cutaway view of a wheel showing a wound magnetic flux channel transverse wound stator permanent magnetic motor assembled within the hub of the wheel for driving the wheel.

FIG. 17 is a cutaway view of a wheel showing a wound magnetic flux channel transverse wound stator permanent magnetic motor assembled within the hub of the wheel for driving the wheel. As shown, the motor assembly includes three wound magnetic flux channels 106 each encasing a transverse wound coil winding and having a magnetic ring of mounted permanent magnets that is installed in a wheel with a tire for powering a land vehicle.

Figure 18:
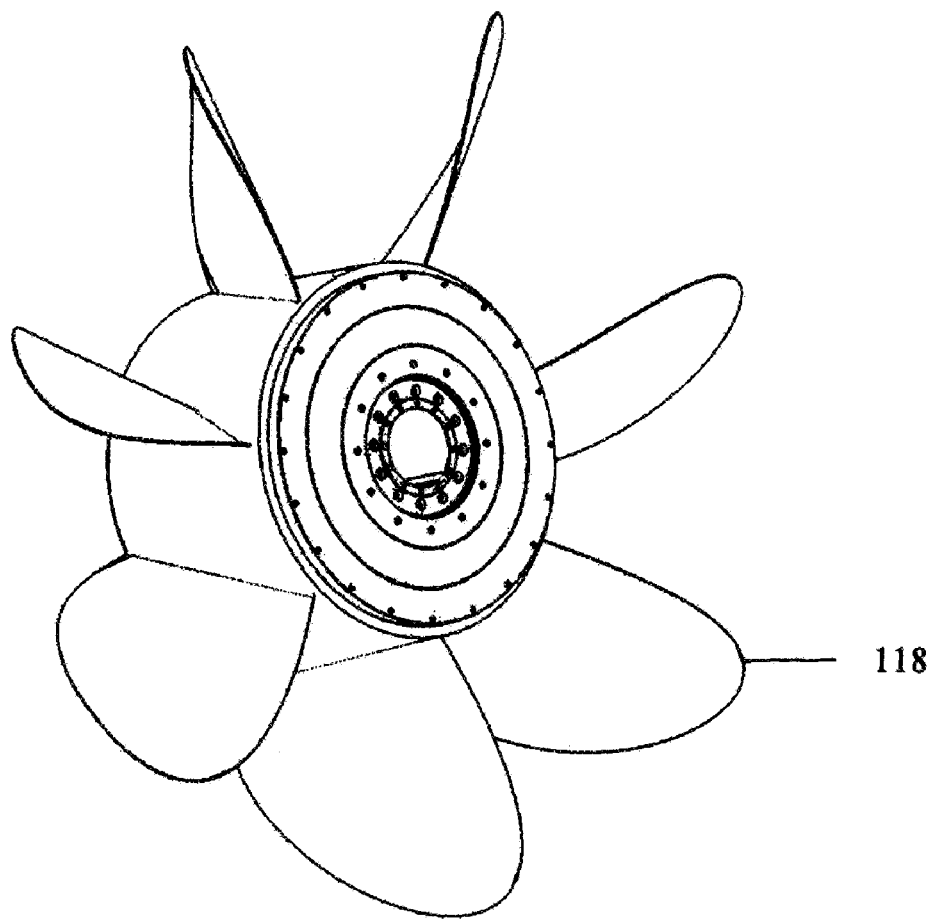
FIG. 18 is a perspective view of a marine propeller.
Figure 19:
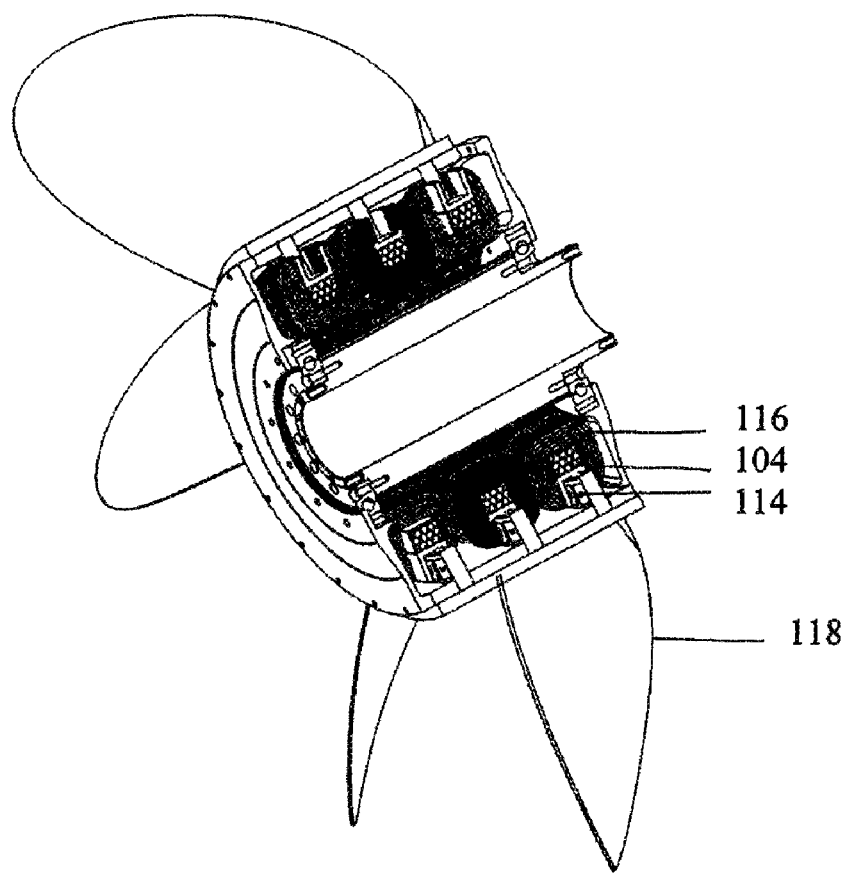
FIG. 19 is a cutaway view of the marine propeller of FIG. 18 showing a wound magnetic flux channel transverse wound stator permanent magnetic motor assembled within the hub of a marine propeller for driving the marine propeller.

FIG. 18 is a perspective view of a staggered area, varied prime number marine propeller blade and FIG. 19 is a cutaway view of the marine propeller of FIG. 18 showing a wound magnetic flux channel transverse wound stator permanent magnetic motor assembled within the hub of a marine propeller, the with streamlining hub cone omitted for clarity, for driving the marine propeller. The propeller blades are a prime number (seven in this illustration) which may be staggered slightly and/or have different amounts of area to minimize its acoustical signature. As shown, the marine propeller includes a transverse wound coil winding 104 encased in the wound magnetic flux channel 106 with a magnet ring 114 containing mounted Permanent Magnets.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A parallel pole direct drive motor comprising:
an outside rotor having a circular rotor disc with a ring of plural magnets with alternating polarities flush mounted into plural holes around a circumference of the circular rotor disc a distance from an outer edge of the circular rotor disc;
an inside stator assembly having a ring of wound magnetic flux channel pole pieces corresponding to a phase of the motor attached with a bobbin housing a transversely wound stator winding to capture and focus the magnetic flux emanating from the transverse winding and channel the magnetic flux to the ring of wound magnetic flux channel pole pieces, each pole piece body having au-shaped gap on the radial outer side of the bobbin to form a magnetic flux channel to receive the circular rotor disc with flush mounted ring of magnets in the formed magnetic flux channel to direct and focus the captured magnetic flux toward and delivering the captured magnetic flux to the ring of plural flush mounted magnets in the formed magnetic flux channel, perpendicular magnetic lines of force emanating at a surface of each wound magnetic flux channel pole piece; and
a controller coupled with a feedback electronics for monitoring a timing, speed and direction and coupling the feedback signal to a processing unit for determining and adjusting and drive electronics.

2. The motor of claim 1 wherein the rotor disc containing the plural magnets is one of a plastic, fiberglass, carbon fiber or other inert material that does not respond to the force of a magnetic field produced by the plural magnets and having plural alignment and mounting holes.

3. The motor of claim 1 wherein the wound magnetic flux channel pole pieces comprises:
a ring shaped stator form having plural spaced apart spacer protrusions around the outer perimeter of the ring shaped stator form and an interior rim corresponding to the bobbin, plural layered strands of one of insulated wire and amorphous tape wound around the ring shaped stator form and attached bobbin layered strands cut away to produce u-shaped spacers and u-shaped wound magnetic flux channel pole pieces that form the magnetic flux channel on the radial outer side of the bobbin.

4. The motor of claim 3 wherein the stator form comprises:
an inert material that does not respond to the force of a magnetic field produced by the plural magnets molded to form the spacer protrusions between the alternating wound pole pieces of the stator.

5. The motor of claim 3 wherein the stator form comprises:
a stator form produced by one of injection molding and Rapid Prototyping.

6. The motor of claim 3 wherein the plural spaced apart spacers deflect the magnetic flux carrying one of the insulated wire and amorphous tape away from the adjacent wound magnetic flux channel pole pieces while the one of the insulated wire and amorphous tape is being wound around the stator form and attached bobbin.

7. The motor of claim 3 wherein the u-shape magnetic flux channel comprises:
plural alternating u-shaped wound magnetic flux channel pole pieces and u-shaped spacer protrusions, each u-shaped wound magnetic flux channel pole pieces define u-shaped magnetic pole pieces, wherein each of the u-shaped magnetic pole pieces forming a first parallel pole piece having a polarity and a second parallel pole piece having an opposite polarity, the ring of plural magnets of the circular rotor disc passing between the parallel first and second pole pieces during operation with a distance between each parallel pole pieces and each pole of the plural magnets.

8. The motor of claim 1 wherein the rotor disc is a non-metallic rotor disc with plural holes cut out by a numerically controlled water jet abrasive cutter to flush mounted Neodynium-iron-boron permanent magnets in the plural holes.

9. The motor of claim 1 wherein the rotor disc is a composite material selected from a group consisting of fiberglass and carbon fiber matrix with plural holes that are is water jet machined in the rotor disc, alternating pole Neodymium-boron-iron permanent magnets alternatingly inserted into the plural holes.

10. The motor of claim 8 wherein the rotor disc is a plastic rotor disc in which the permanent magnets are flush mounted and are bonded in place with one of an epoxy and a cyanoacrylate anerobic adhesives.

11. The motor of claim 1 wherein the magnets are plural flush mounted neodymium-iron-boron permanent magnets with alternating poles wherein a radial spacing between adjacent permanent magnets is at least approximately 25 percent of the pole face radial dimension.

12. The motor of claim 1 wherein a spacing between adjacent magnets is within a range between approximately 1.25 and greater than approximately 1.25 times a width of the magnet to reduce fringing losses and a swept width of the wound magnetic flux channel pole piece is 1.25 times the magnet width to improve the motor torque and EMF waveform.

13. The motor of claim 1 wherein the rotor disc comprises:
plural rotor discs separated by rotor disc spacers to form the outside rotor.

14. The motor of claim 1 wherein the rotor disc is fabricated into two or more segments to allow the rotor disc to be inserted into the magnetic flux channel after the stator assembly is complete.

15. The motor of claim 1 wherein the drive electronics comprises:
a WYE, Delta, or STAR configured electrical circuit connected to the transverse stator winding to apply voltage waveform and current to the transverse stator winding.

16. The motor of claim 15 wherein the feedback electronics comprises:
a sensor device to sense speed, acceleration, and load connected with the processing unit to send a signal representing the sensed speed, acceleration, and load wherein the processing unit to adjust the timing and waveform of the applied voltage and current to the stator winding according to an optimum waveform and timing information digitally stored in a lookup table database.

17. The motor of claim 15, further comprising:
plural silicon carbide MOSFET semiconductor switches, each one connected to one leg of the one of the STAR, DELTA, OR WYE electrical circuits to independently drive each transverse winding and reduce electrical interaction to increase switching frequency and efficiency.

18. The motor of claim 17, further comprising:
a voltage regulator; and
a power semiconductor switch serially connected to feed a stator winding, the semiconductor switches switched on and off once for each electrical half cycle to apply the voltage waveform to the corresponding stator winding from the output of the series voltage regulator.

19. The motor of claim 17, further comprising:
a voltage regulator; and
a power semiconductor switch serially connected to feed a stator winding, the semiconductor switches switched on and off once for each electrical half cycle to vary a pulse timing and duration to control motor speed and torque.

20. The motor of claim 17, further comprising:
an LRC filter connected between the semiconductor switches and the one of the STAR, DELTA, OR WYE electrical circuits to remove switching frequency noise to reduce interference to the magnetization response of the wound magnetic flux channels pole pieces to reducing hysteresis loss and improve torque and efficiency.

21. The motor of claim 20 further comprising:
a feedback circuit for obtaining a current feedback waveform from the output of the LRC filters, wherein the processing unit compares the current feedback signal with a stored optimal current waveform to generate a corrected applied voltage and current waveform to driving the transverse winding of the motor during operation.

22. The motor of claim 1, wherein the controller feedback circuit comprises:

plural cascaded Hall effect sensors located near a path of the permanent ring of plural magnets to generate a stair step sine wave that conveys information on rotor speed, direction, and timing to the controller for generating an output waveform for driving the parallel pole direct drive motor.

23. The motor of claim 1 wherein the controller further comprises:
a waveform lookup table stored memory coupled with the processing unit, the waveform lookup table containing digital representations of optimal current and voltage waveforms for best motor performance at various speeds, power loadings, acceleration and deceleration rates, wherein the processing unit compares the feedback signal with data in the waveform lookup table to adjust the output of the drive electronics.

24. The motor of claim 17 further comprising:
an over-running fly-forward diode in series with each semiconductor switch to allow higher speed motor operation wherein the reverse EMF voltage of the stator can exceed the maximum power supply voltage available.

25. The motor of claim 1, wherein the motor is a direct drive wheel motor with a tubeless tire fitted directly to a rim of the wheel motor.

26. The motor of claim 1, wherein the motor is a direct drive marine propeller motor fitted directly in a hub of a marine propeller.

27. The motor of claim 1, wherein plural wound magnetic flux channel pole pieces of the inside stator comprises:
at least two sets of wound magnetic flux channel pole pieces and attached bobbin, each set separated by a distance and corresponding to one phase of the motor; and
at least two transverse windings, a section of each one of the transverse windings passing through a different one of the bobbins, the remaining section of each transverse winding folding back outside the set of wound magnetic flux channel pole pieces in close proximity to an outer base of the set of corresponding wound magnetic flux channel pole pieces, each set of wound magnetic flux channel pole pieces and corresponding transverse winding forming a partial stator.

28. The motor of claim 3, further comprising:
a non-metallic alignment plate having alignment slots; and
an alignment key protruding from an outer side of each one of the u-shaped spacers to align the u-shaped spacers with the alignment slots in the non-metallic alignment disc.

29. The motor in claim 26, wherein the non-metallic disc is used to locate, time, and mount the stator wound magnetic flux channel pole pieces and transmit the torque reaction to a non-rotating axle.

30. The motor of claim 29, further comprising:
an alignment key protruding from an exterior side of each of the u-shaped spacers; and
an alignment disc having alignment slots corresponding to the alignment key to key the wound magnetic flux channel pole pieces in place, the alignment disc on the same axis having an offset for the stator segments of 120 electrical degrees.

31. The motor in claim 30, wherein the stator segments are offset by 90 electrical degrees from each other axially on the same plane.

32. The motor of claim 26 wherein the marine propeller includes a prime number of propeller blades.

33. The motor of claim 32 wherein the marine propeller blades are staggered in location.

34. The motor of claim 32 wherein the marine propeller blade surface areas are varied to minimize the water acoustical noise signature of the propeller.

35. The motor in claim 1, wherein the parallel pole direct drive motor is assembled into a hub of a wheel for powering a land vehicle.

36. The motor in claim 3, wherein the spacer protrusions of the stator form include:
round keying holes to facilitate the winding of the plural layered strands of insulated wire or amorphous tape by a computer programmable Toroid winding device.

\* \* \* \* \*